United States Patent [19]
Pearson et al.

[11] Patent Number: 5,863,172
[45] Date of Patent: Jan. 26, 1999

[54] STAGING, TRACKING AND RETRIEVAL SYSTEM WITH A ROTATABLE STORAGE STRUCTURE

[75] Inventors: William A. Pearson, Martinez, Calif.; Donald P. Buller, San Jose, Calif.; Daniel C. Perry, San Jose, Calif.; Jack Quinton, San Jose, Calif.; Sean Patrick Hirka, Hamilton, Ohio; Jeff Johnson, Henderson, Nev.

[73] Assignee: Computer Aided Systems, Inc., Hayward, Calif.

[21] Appl. No.: 796,274

[22] Filed: Feb. 7, 1997

[51] Int. Cl.⁶ ..................................... B65G 1/06
[52] U.S. Cl. ................... 414/331; 198/801; 198/805.01; 198/833; 414/609; 414/787
[58] Field of Search ................... 414/331, 609, 414/787; 198/833, 803.01, 801, 435; 211/1.52, 121, 122, 166, 90.02, 207, 208; 312/168

[56] References Cited

U.S. PATENT DOCUMENTS

| | | | |
|---|---|---|---|
| 2,661,259 | 12/1953 | Rippon | 414/331 X |
| 2,687,814 | 8/1954 | Romick | 414/331 |
| 3,258,109 | 6/1966 | Breitenstein et al. | 211/121 X |
| 3,410,390 | 11/1968 | Petersen | 198/833 X |
| 3,780,852 | 12/1973 | Weiss et al. | 414/331 X |
| 3,883,203 | 5/1975 | Lexe | 414/787 X |
| 3,902,723 | 9/1975 | Gondek | 414/787 |
| 3,926,489 | 12/1975 | Futch | 198/803.01 X |
| 4,236,858 | 12/1980 | Hoese et al. | 414/331 |
| 4,252,488 | 2/1981 | Kochanneck | 414/331 |
| 4,314,647 | 2/1982 | Harris et al. | 211/121 |
| 4,389,157 | 6/1983 | Bernard, II et al. | 414/787 |
| 4,422,554 | 12/1983 | Lichti | 211/1.56 |
| 4,561,820 | 12/1985 | Matheny, III et al. | 414/331 |
| 4,752,175 | 6/1988 | Lichti | 414/276 |
| 4,883,401 | 11/1989 | Kavieff | 414/273 |
| 4,887,953 | 12/1989 | Greub | 414/331 |
| 4,909,697 | 3/1990 | Bernard, II et al. | 414/331 |
| 4,968,207 | 11/1990 | Lichti | 414/331 |
| 4,976,580 | 12/1990 | Knakrick | 414/254 |
| 4,983,091 | 1/1991 | Lichti, Sr. et al. | 414/331 |
| 4,986,715 | 1/1991 | Asakawa | 414/787 |
| 4,998,857 | 3/1991 | Paravella et al. | 414/331 |
| 5,062,536 | 11/1991 | Tsai | 211/122 X |
| 5,090,863 | 2/1992 | Lichti, Sr. et al. | 414/331 |
| 5,096,366 | 3/1992 | Bernard, II et al. | 414/786 |
| 5,161,929 | 11/1992 | Lichti, Sr. et al. | 414/331 |
| 5,171,120 | 12/1992 | Bernard, II et al. | 414/331 |
| 5,188,245 | 2/1993 | Mabrey | 211/1.52 X |
| 5,197,844 | 3/1993 | Lichti, Sr. et al. | 414/331 |
| 5,238,351 | 8/1993 | Lichti, Sr. et al. | 414/331 |
| 5,255,723 | 10/1993 | Pollock | 198/801 X |
| 5,282,712 | 2/1994 | Lichti, Sr. et al. | 414/331 |
| 5,303,817 | 4/1994 | Kissee | 198/833 |
| 5,337,880 | 8/1994 | Claycomb et al. | 198/347.3 |
| 5,449,262 | 9/1995 | Anderson et al. | 414/266 |

(List continued on next page.)

FOREIGN PATENT DOCUMENTS 194563  2/1965  Sweden ................... 198/801

*Primary Examiner*—David A. Bucci
*Attorney, Agent, or Firm*—Fish & Richardson P.C.

[57] ABSTRACT

A storage system for the storage and retrieval of material goods has a continuous track and a storage carousel movable along the track. The carousel carries a plurality of shelf arrays, each of which includes a plurality of vertically-spaced shelves removably attachable to the carousel at an adjustable vertical pitch. One or more inserter assemblies are disposed adjacent the carousel for transferring cartons onto the carousel. One or more removal assemblies are disposed adjacent the carousel for removing cartons from the carousel. A vertical transport unit has an upward reach disposed adjacent the inserter assemblies for transferring cartons to the inserter assemblies, and a downward reach disposed adjacent the removal assemblies for receiving cartons from the removal assemblies. The vertical transport unit has a plurality of platforms removably attachable to the vertical transport unit at an adjustable pitch. A control system controls the operation of the storage carousel, the inserter assemblies, the removal assemblies and the vertical transport unit.

31 Claims, 19 Drawing Sheets

U.S. PATENT DOCUMENTS

| | | | |
|---|---|---|---|
| 5,472,103 | 12/1995 | Merl | 211/90.02 X |
| 5,472,309 | 12/1995 | Bernard, II et al. | 414/786 |
| 5,478,182 | 12/1995 | Hildebrand et al. | 414/261 |
| 5,505,586 | 4/1996 | Lichti | 414/786 |
| 5,529,168 | 6/1996 | Soriano et al. | 198/803.01 X |
| 5,556,247 | 9/1996 | Lichti, Sr. et al. | 414/331 |
| 5,588,790 | 12/1996 | Lichti | 414/331 |
| 5,593,269 | 1/1997 | Bernard, II | 414/331 |
| 5,601,395 | 2/1997 | Lichti, Sr. et al. | 414/786 |
| 5,634,760 | 6/1997 | Anderson et al. | 414/331 X |
| 5,641,259 | 6/1997 | Perry et al. | 414/268 |

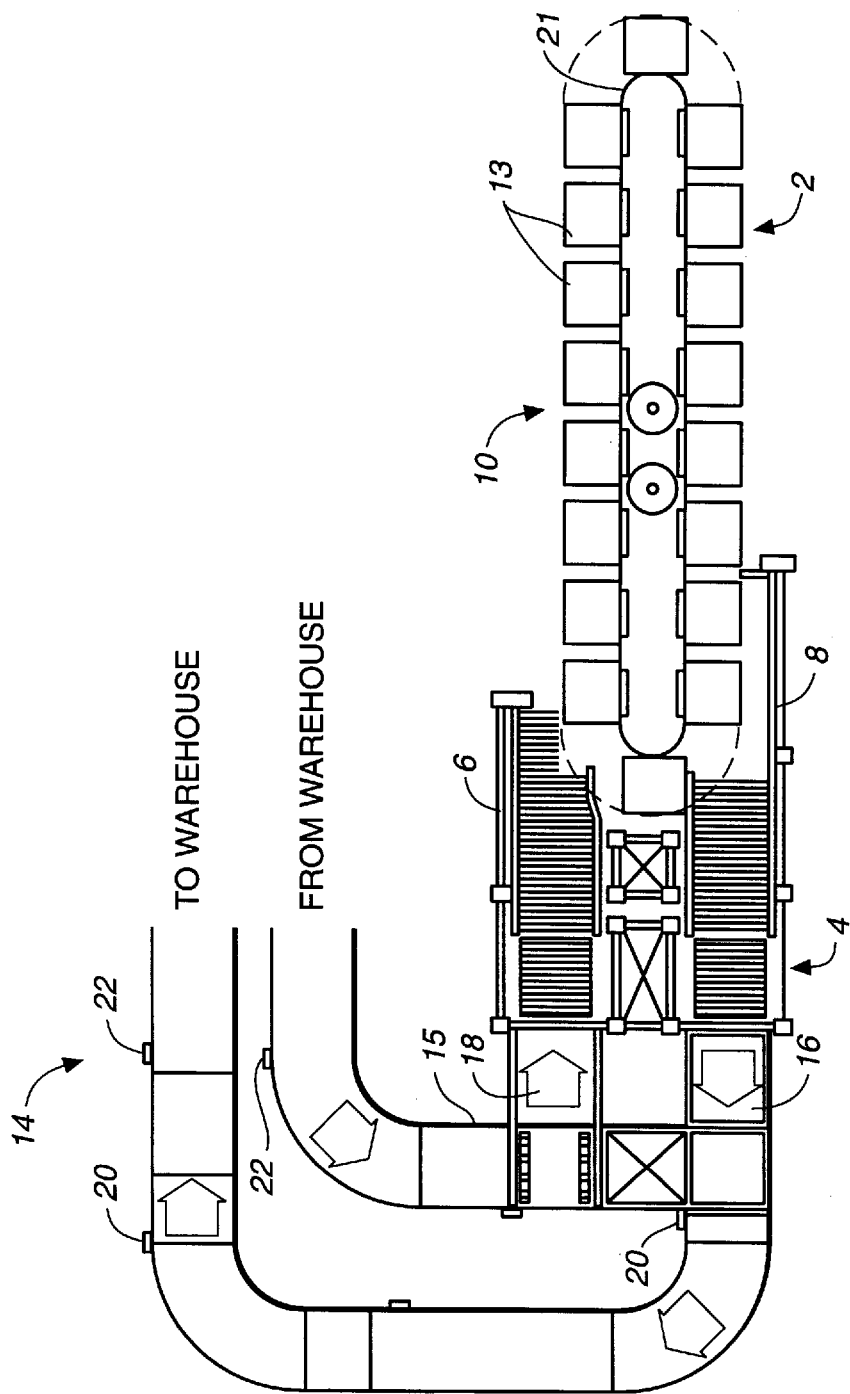

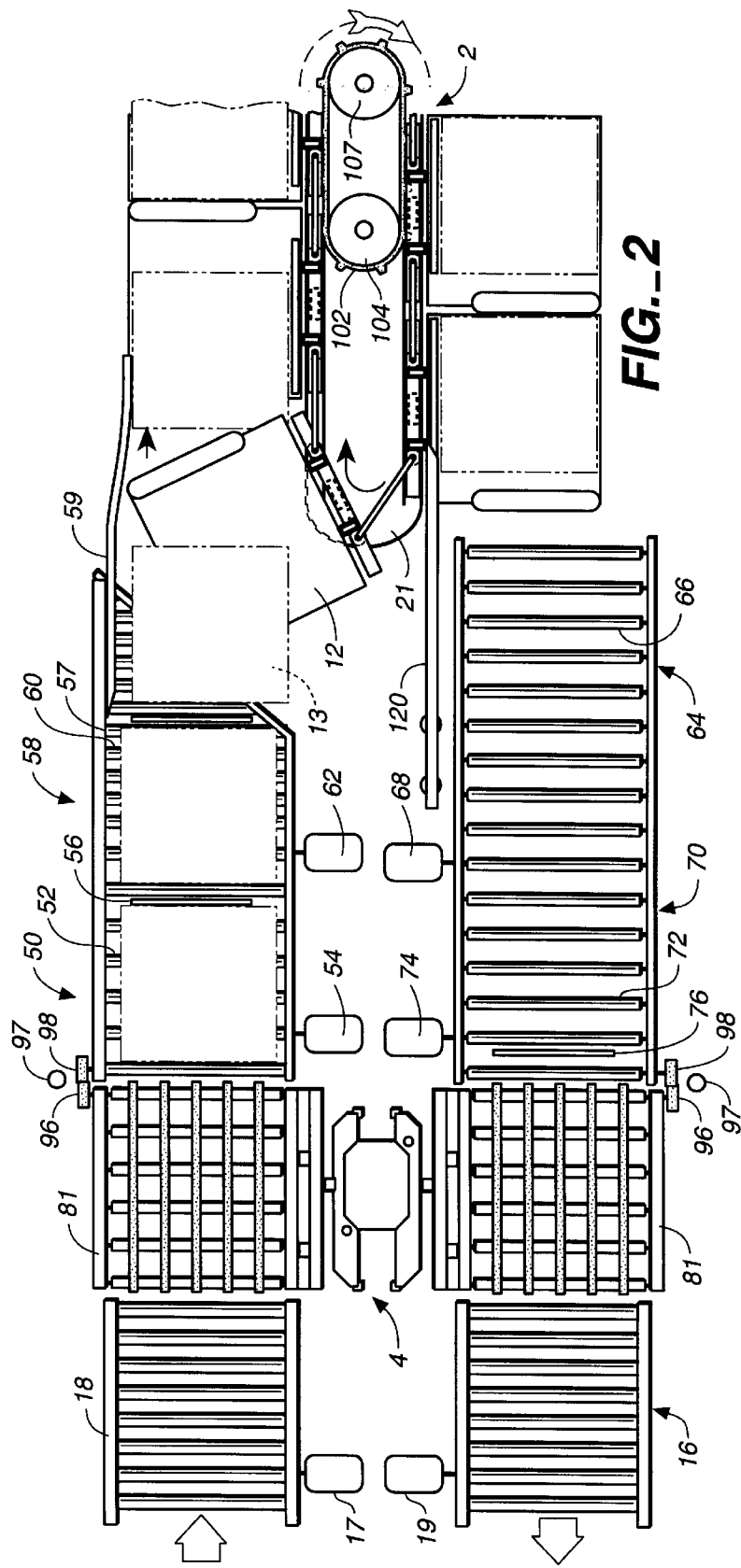
FIG._2

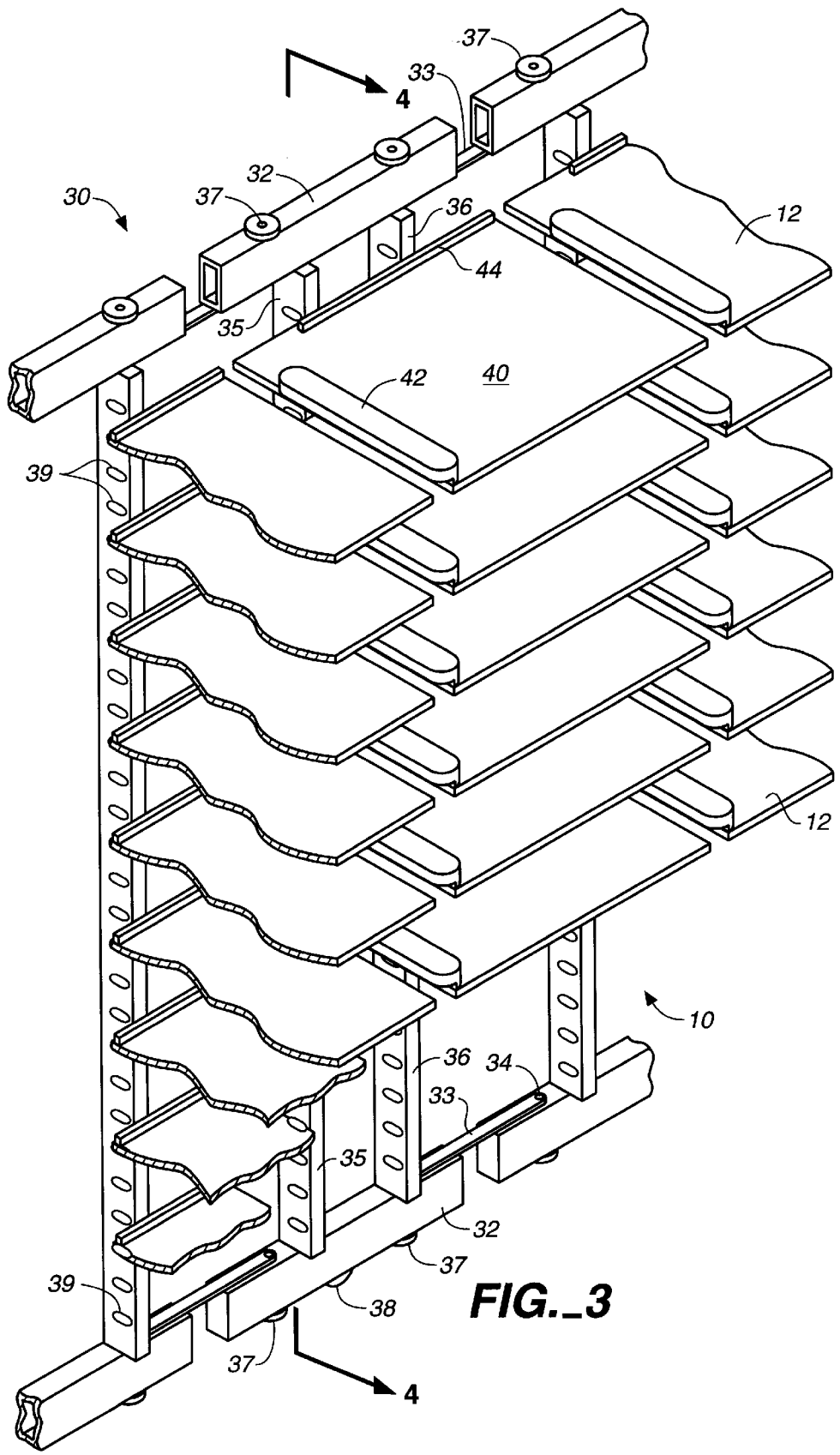
FIG._3

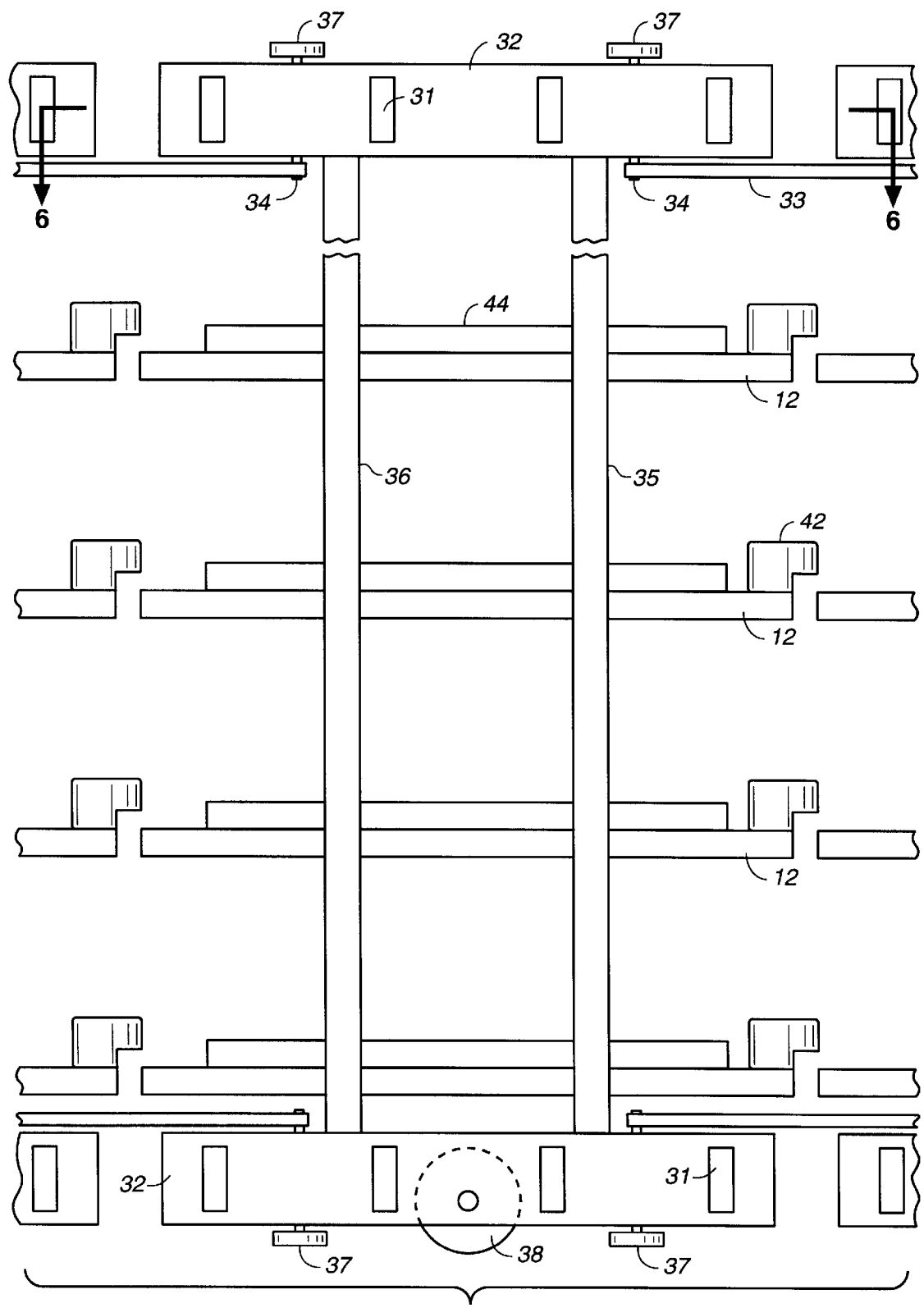
FIG._4

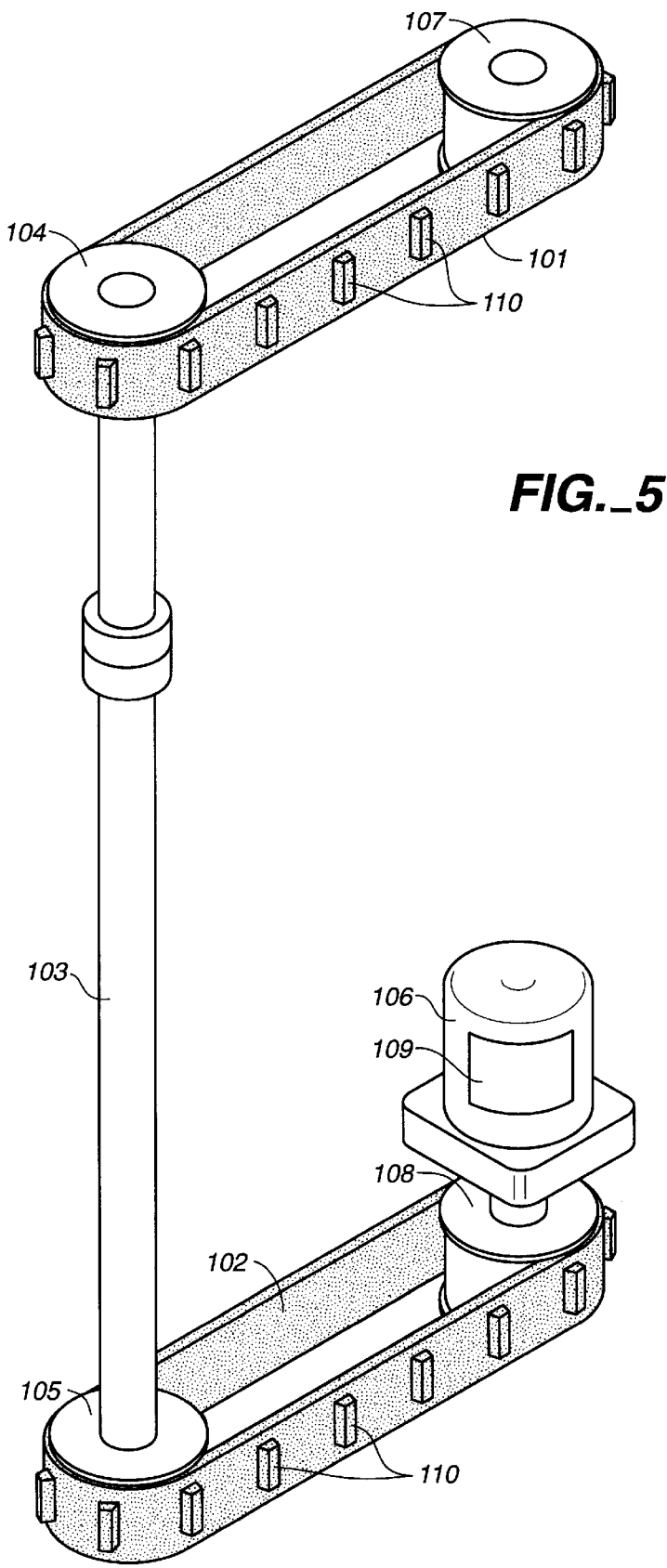
FIG._5

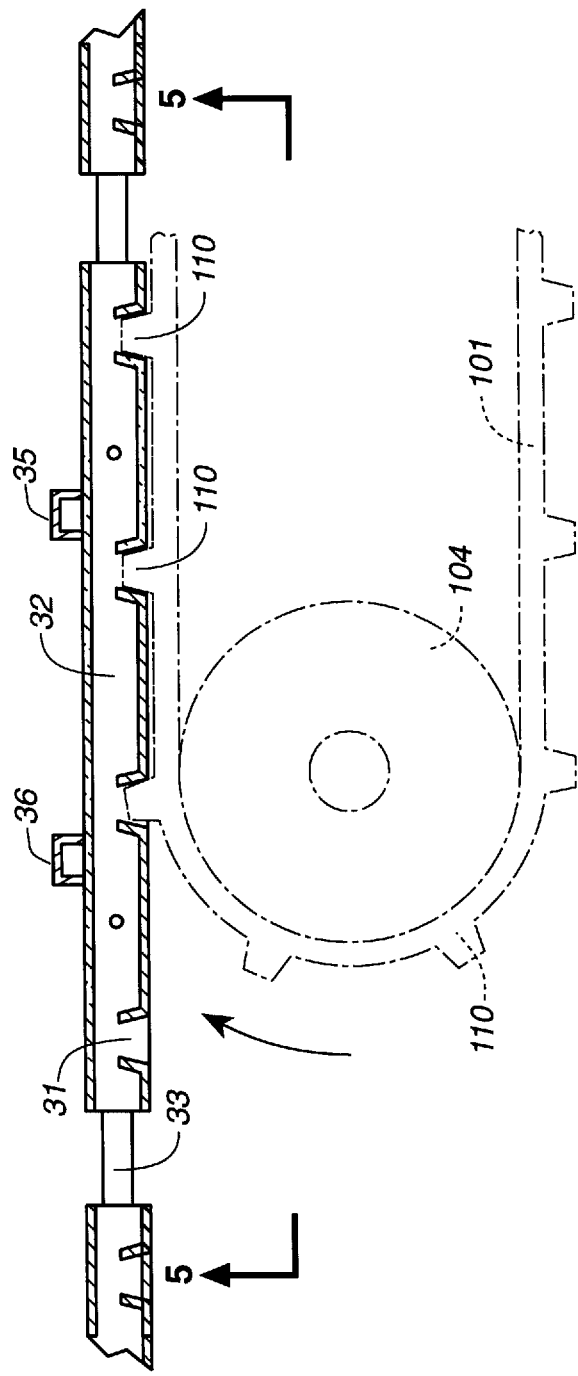

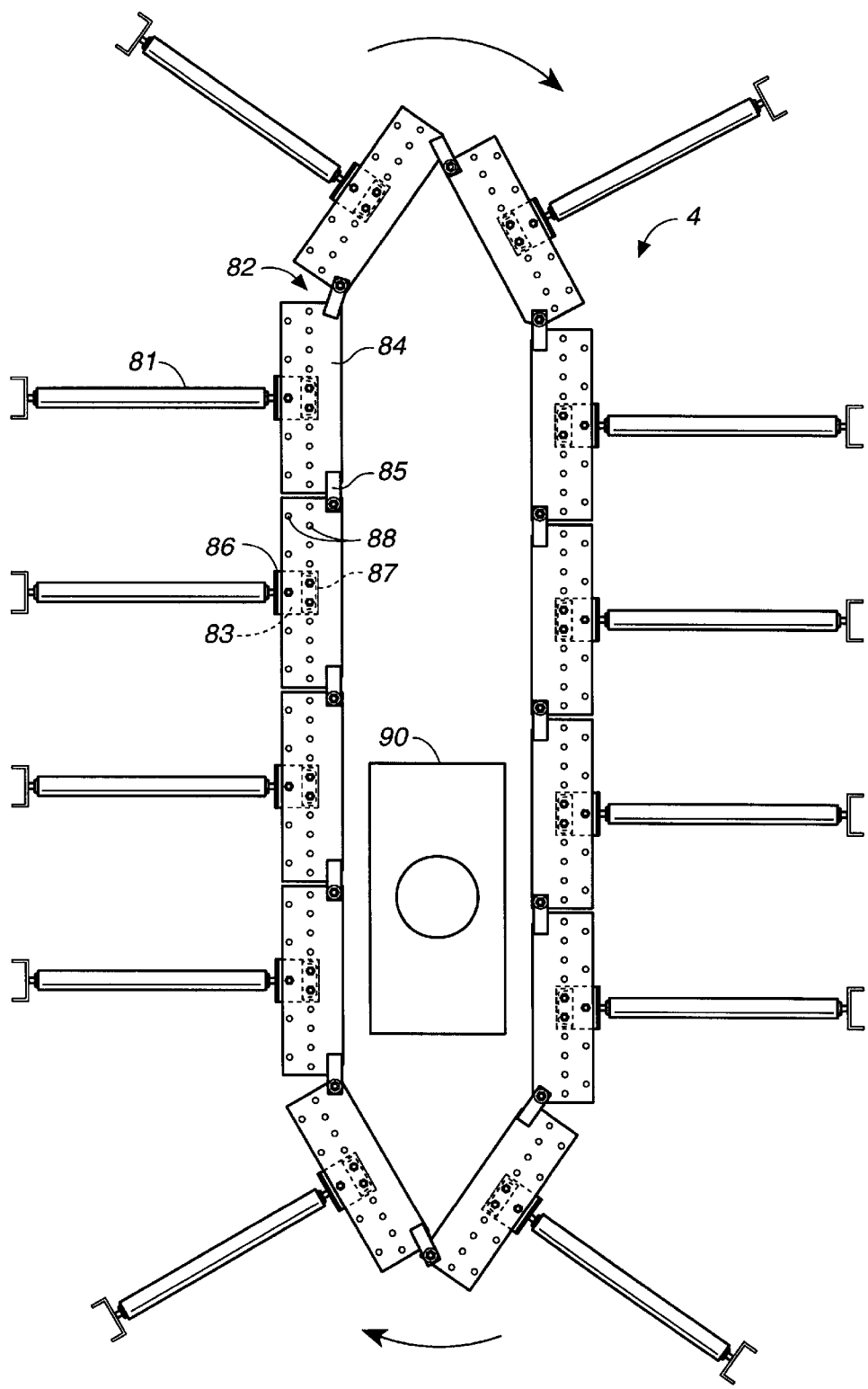
FIG._7

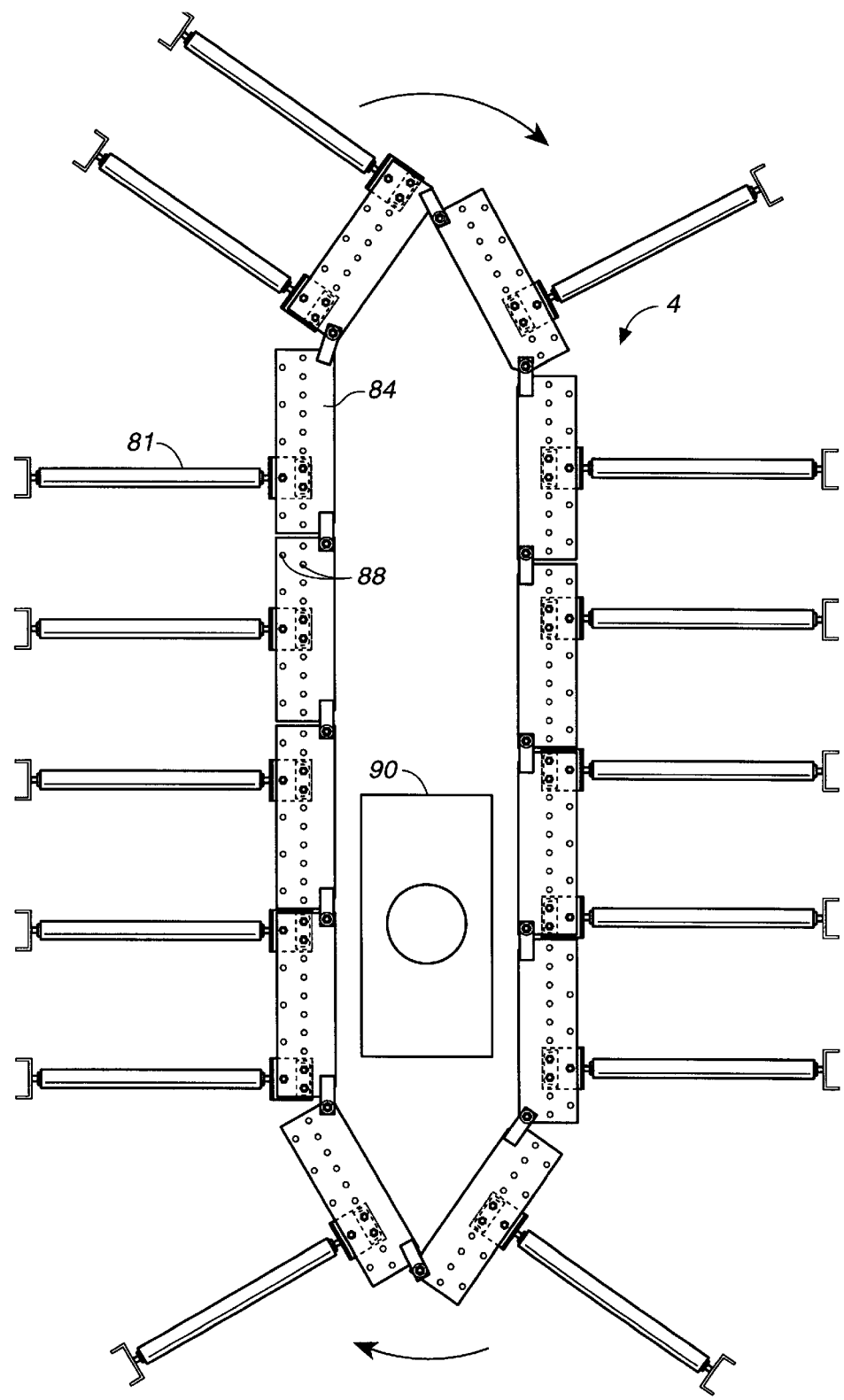
FIG._8

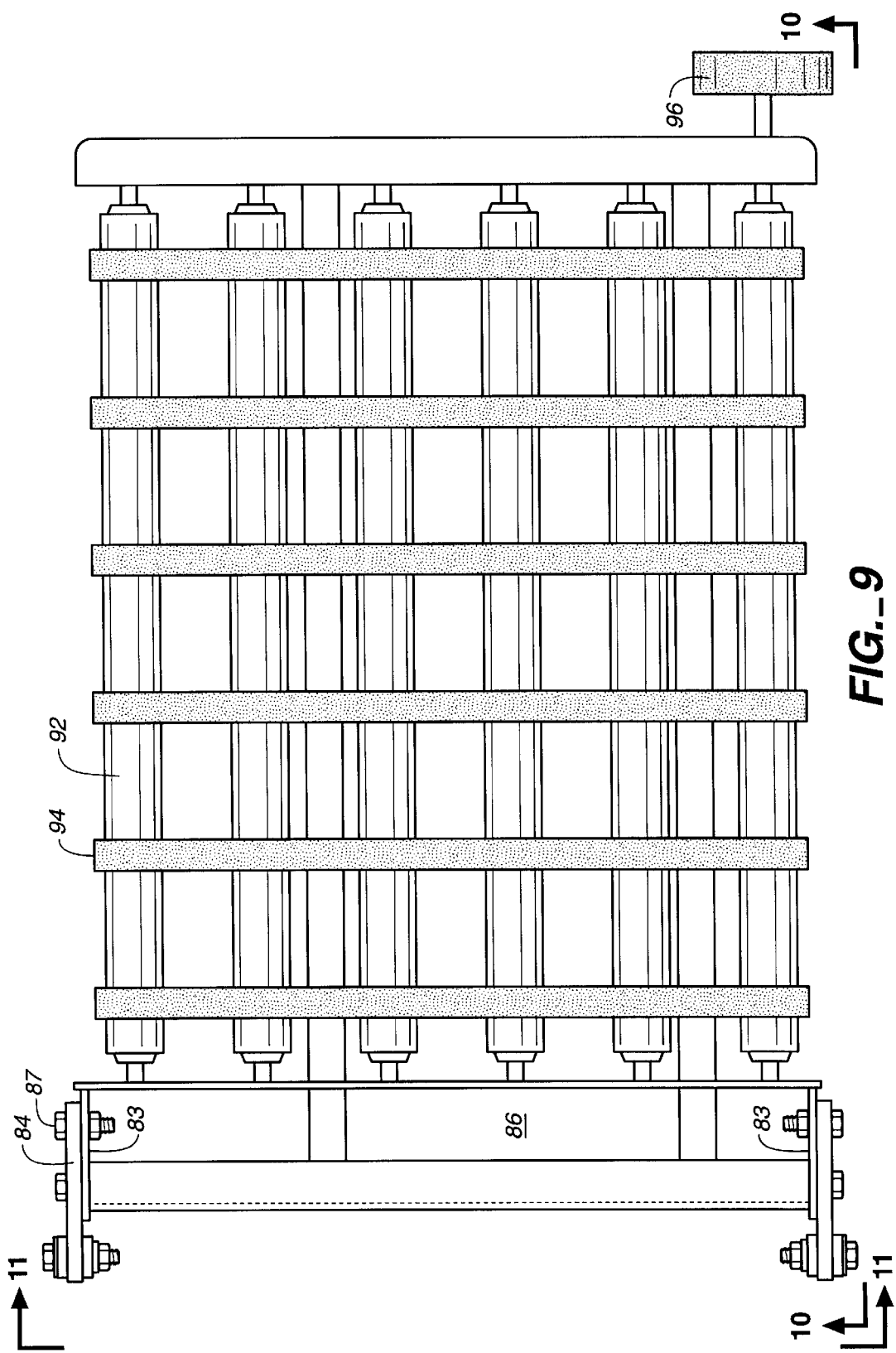
FIG._9

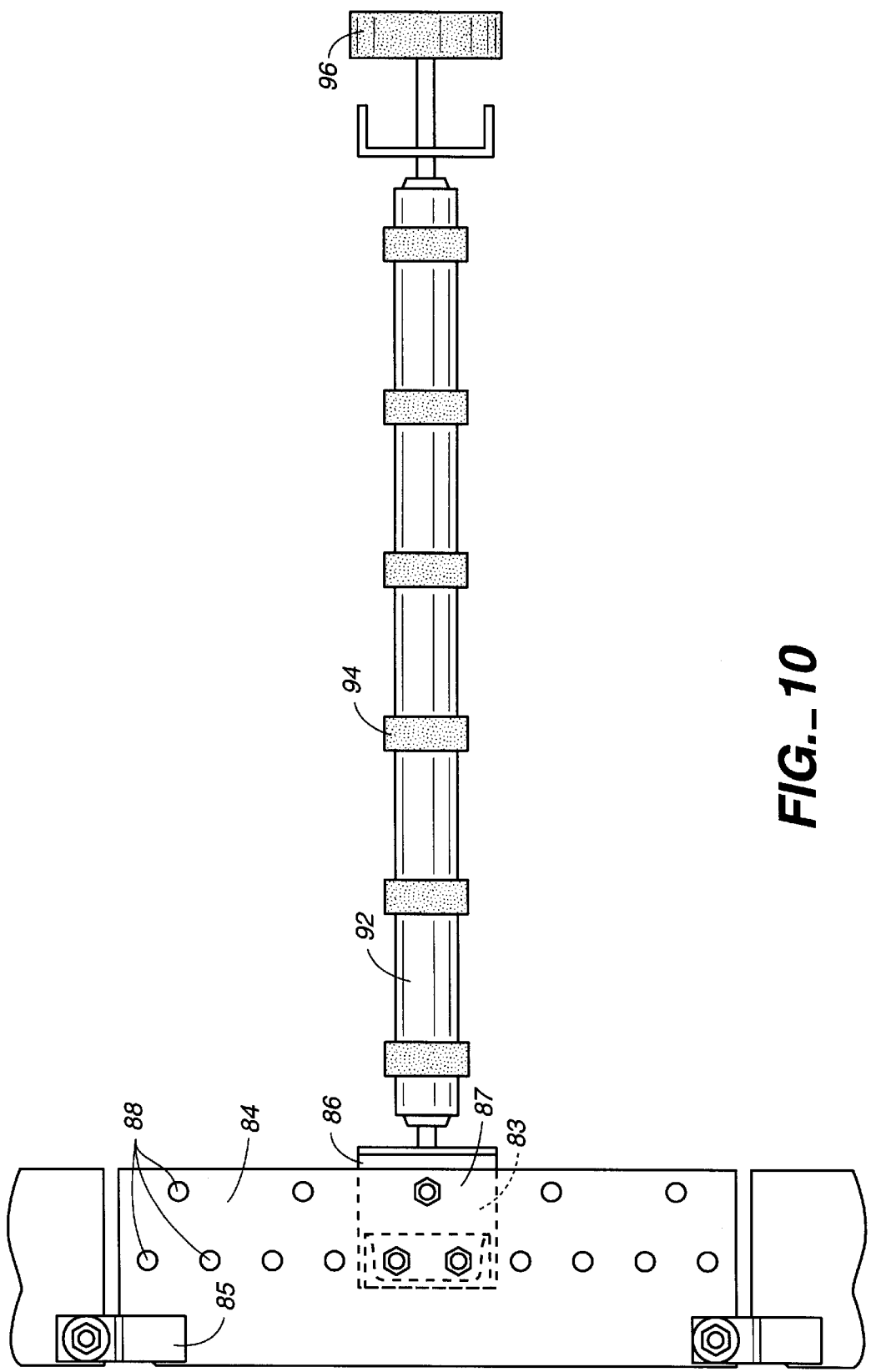
FIG._10

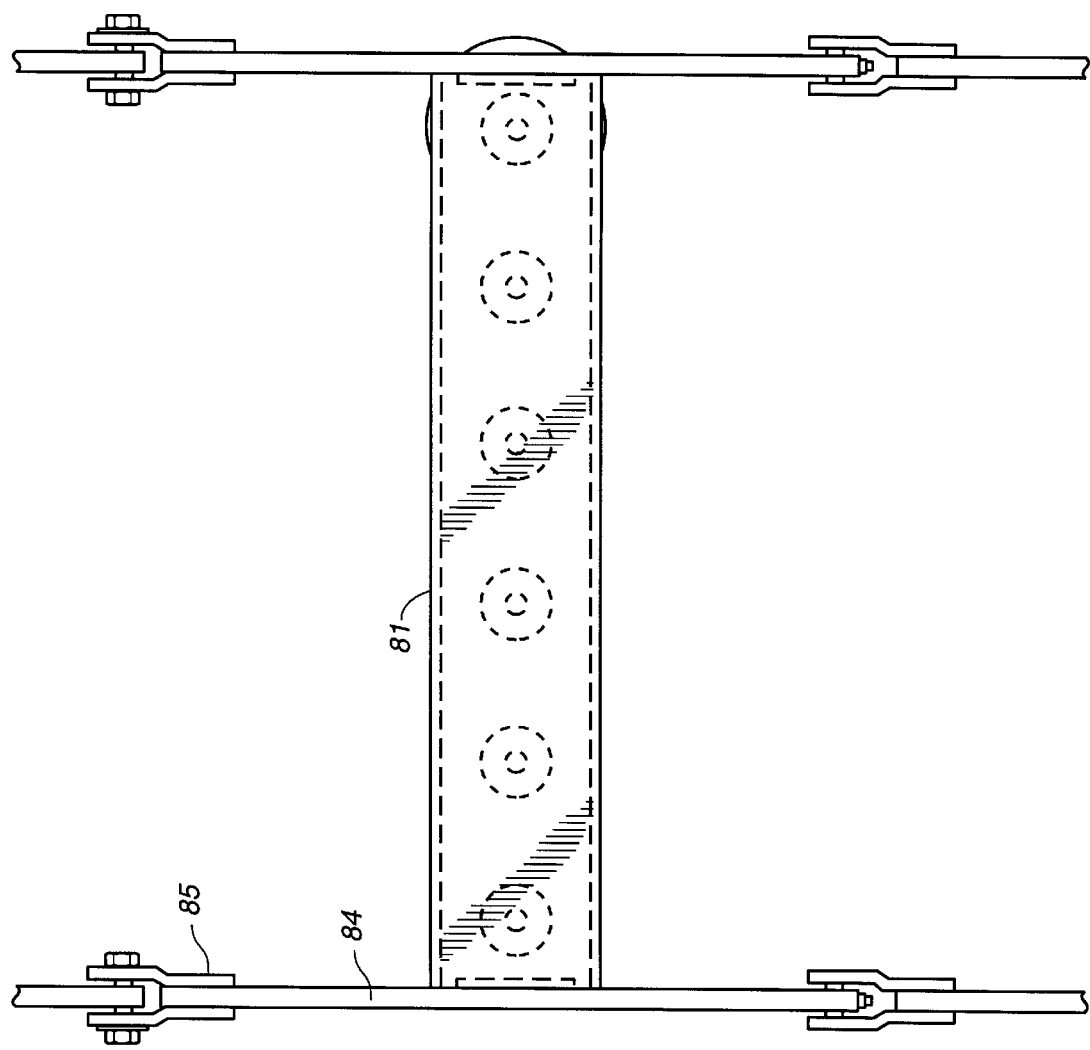
FIG._11

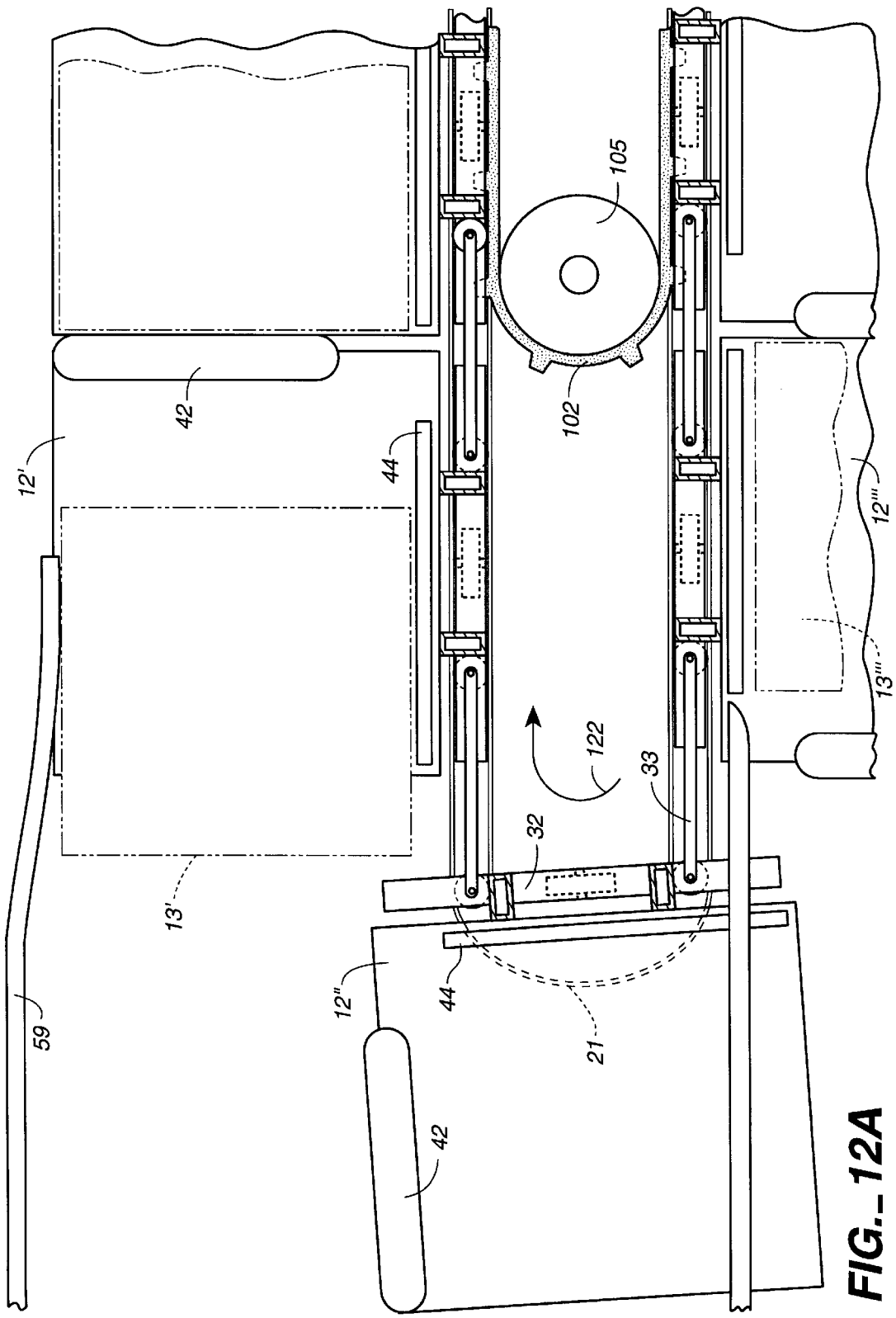
FIG._12A

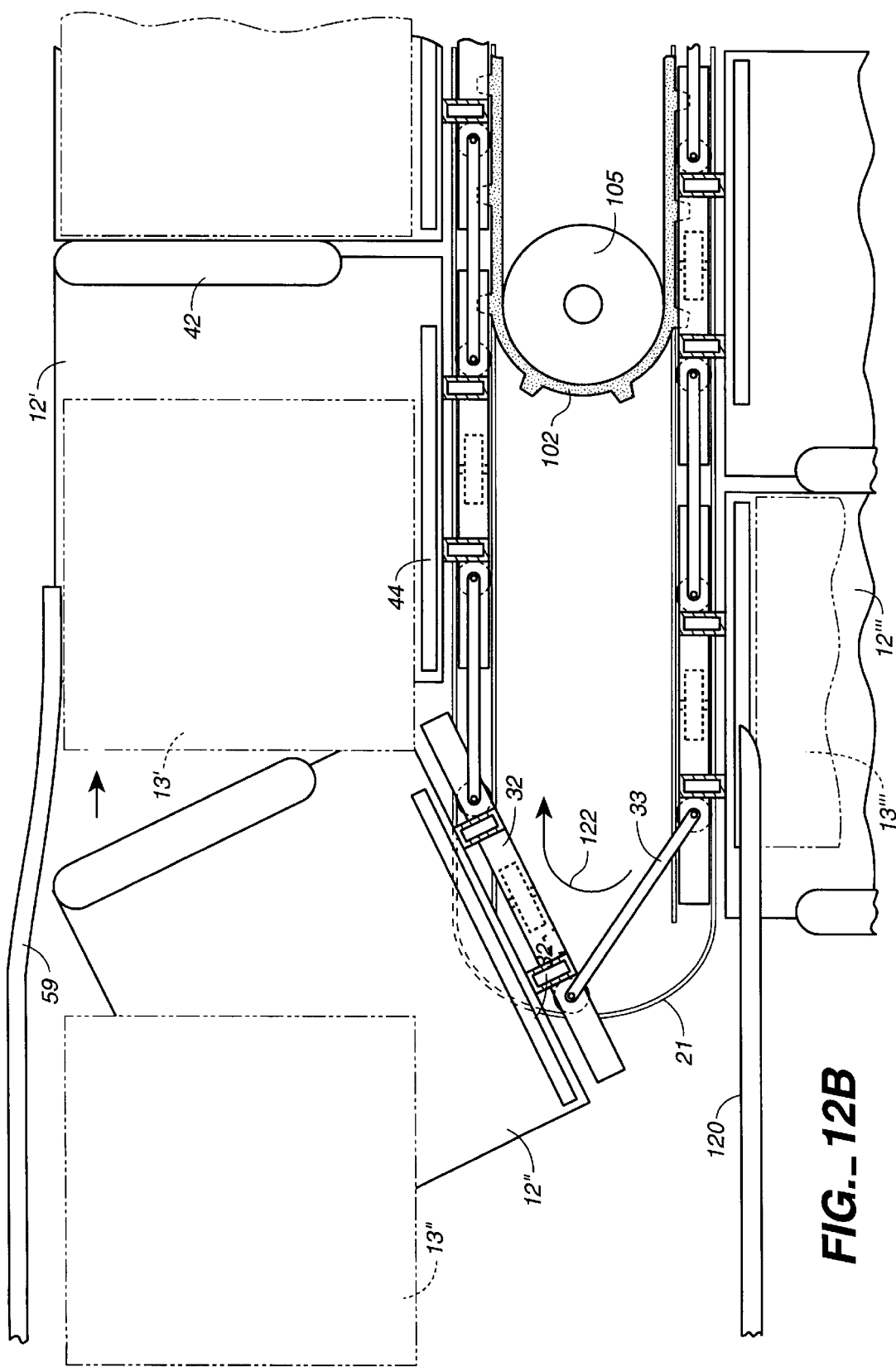

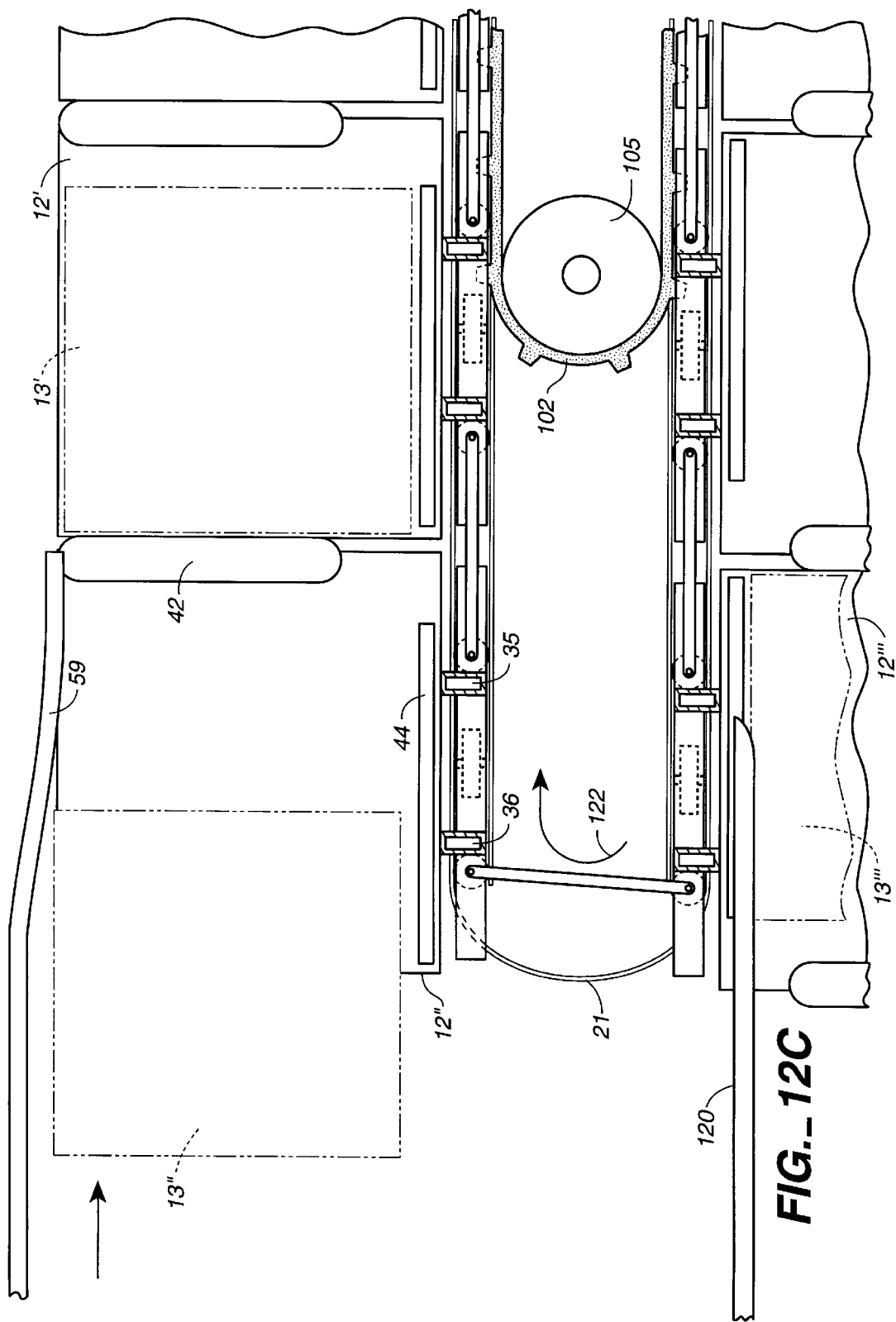

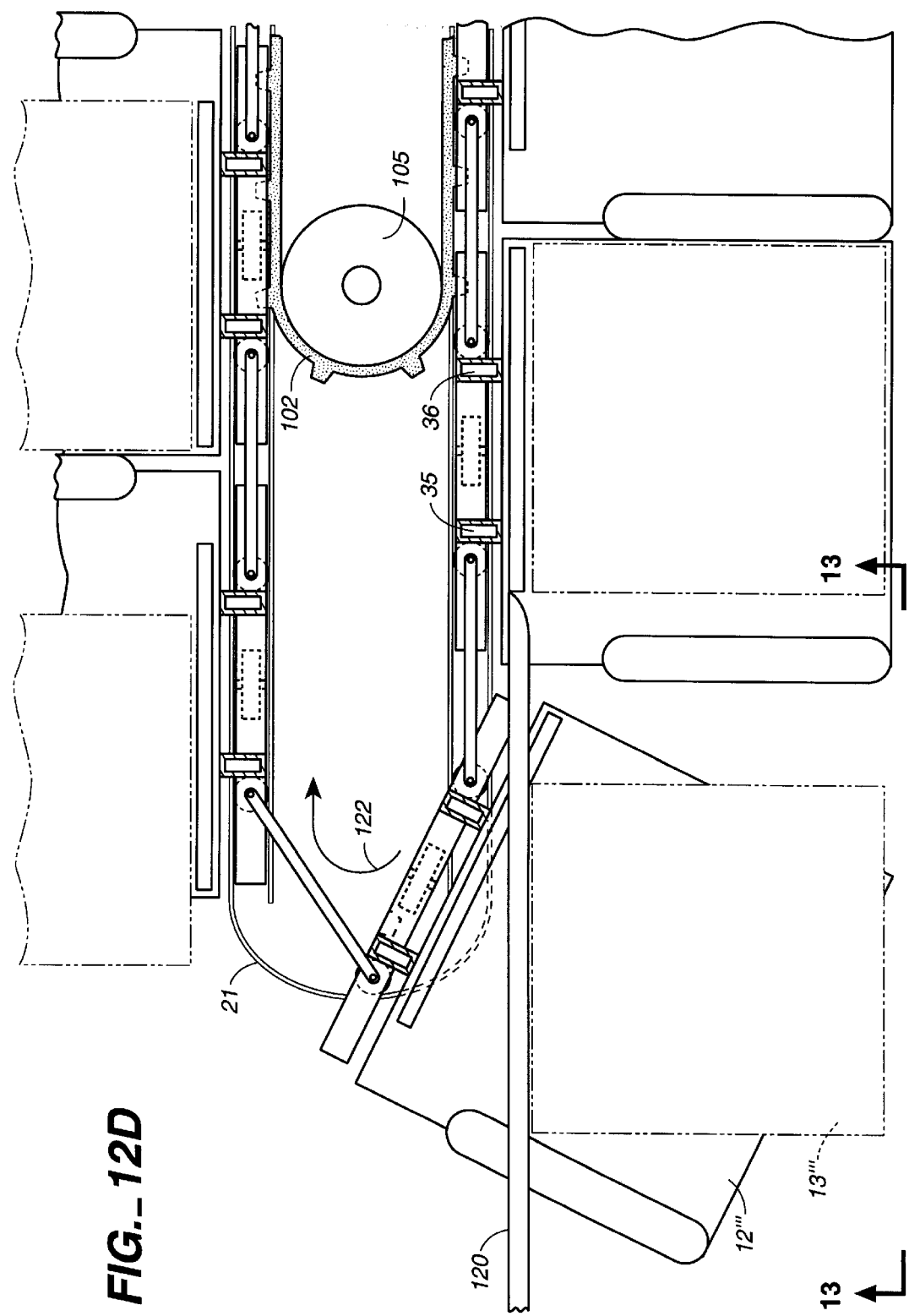
FIG._12D

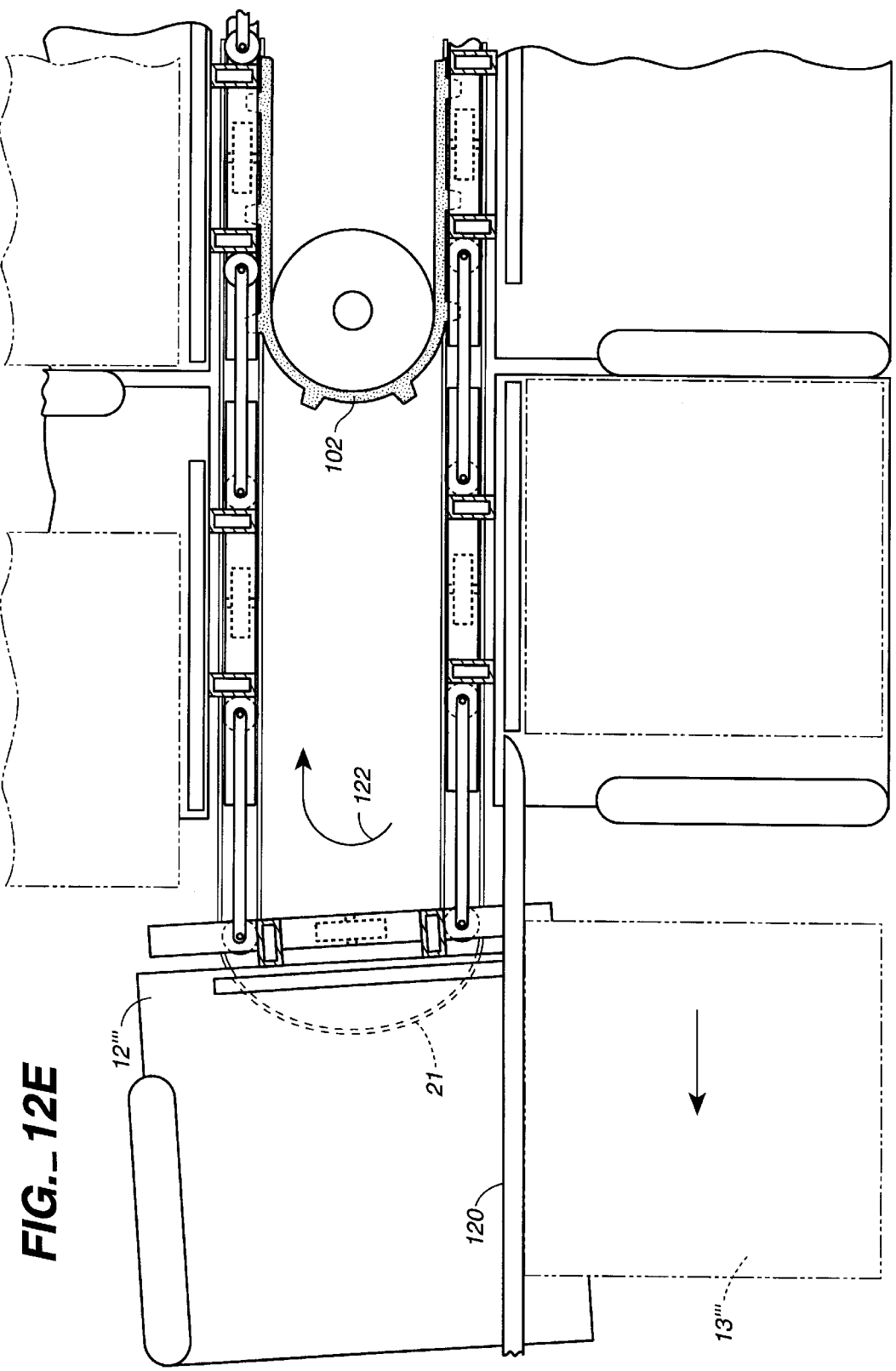
FIG._12E

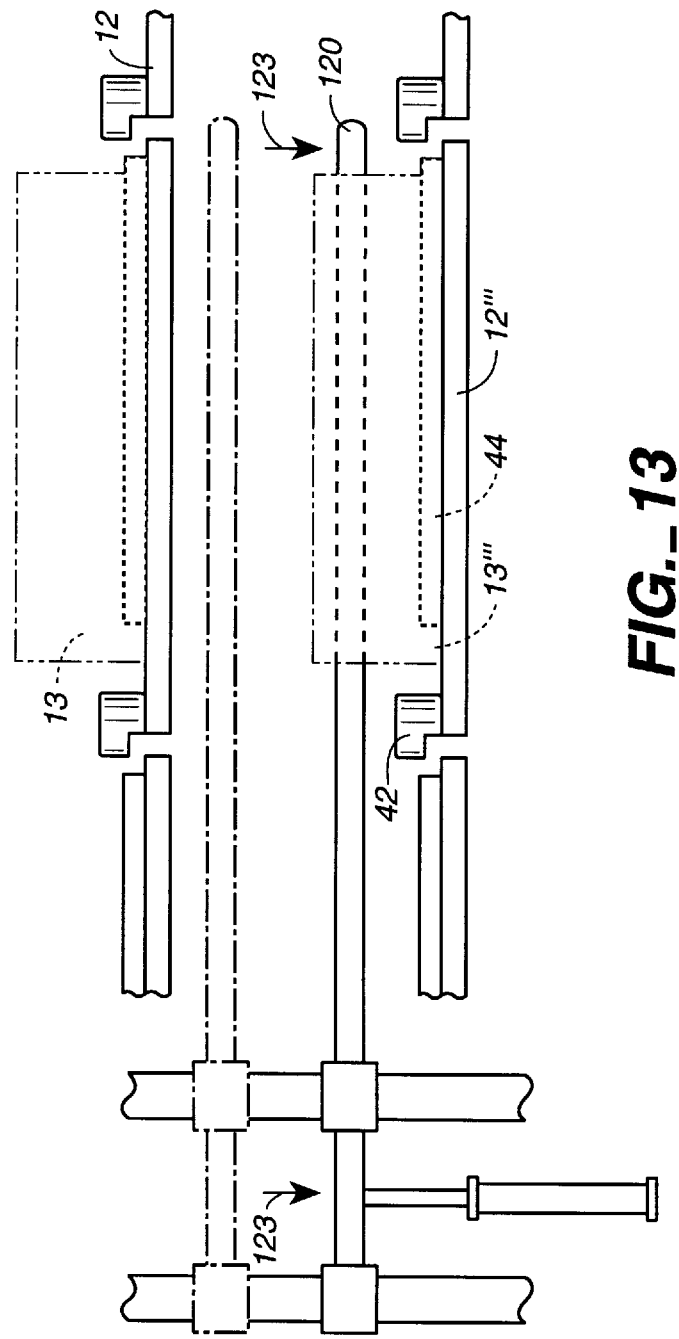
FIG._13

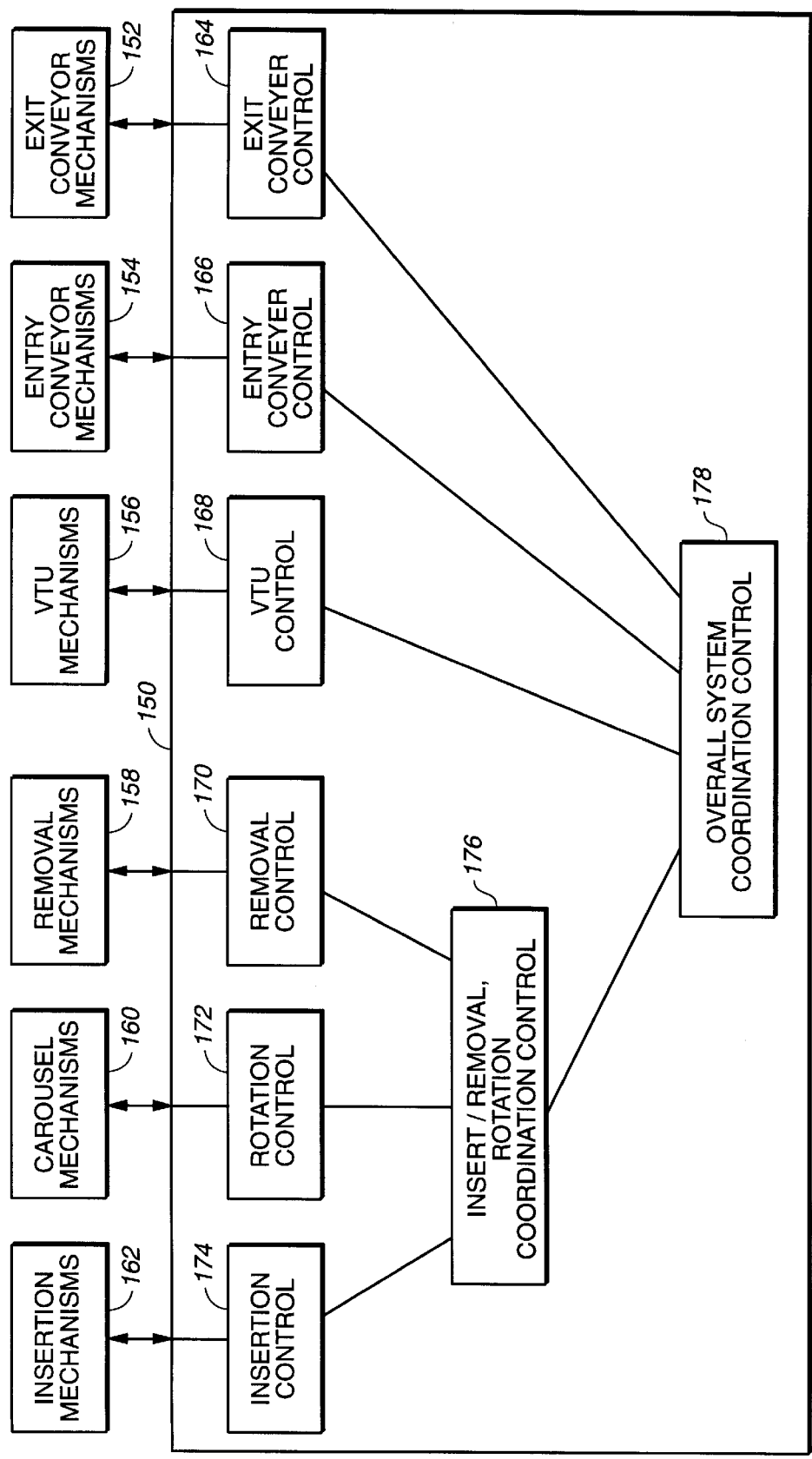
FIG._14

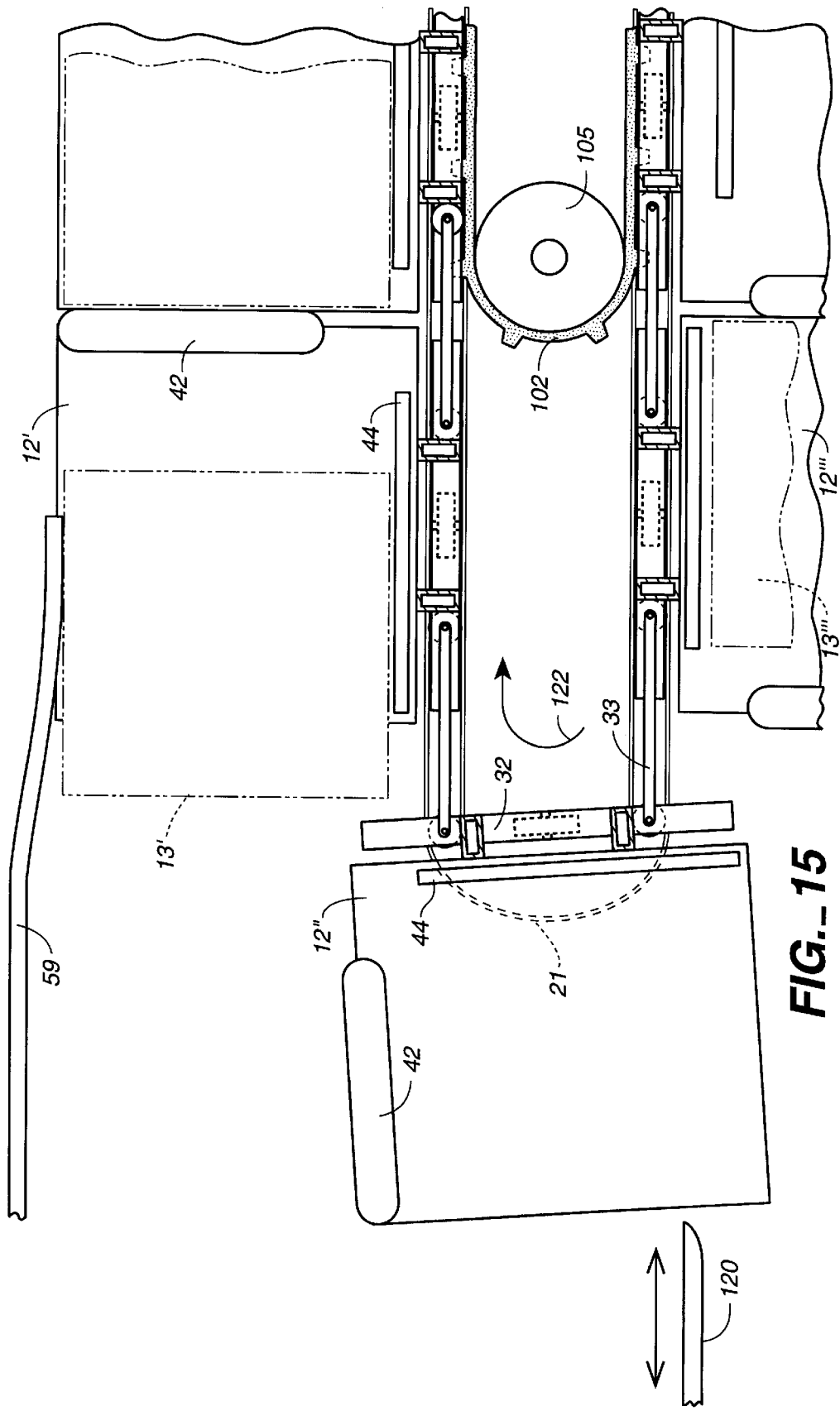
FIG._15

STAGING, TRACKING AND RETRIEVAL SYSTEM WITH A ROTATABLE STORAGE STRUCTURE

BACKGROUND OF THE INVENTION

The present invention relates generally to automated distribution systems for storing and retrieving goods. More particularly, the invention relates to a rotatable storage carousel and supporting mechanisms for inserting and removing variable-sized cartons from the carousel while it remains in continuous motion. As used in the present specification and claims, the terms "carton" and "cartons" include cartons, boxes, bins, totes and other containers for storing or holding items.

Many modern production and warehousing facilities require the storage and retrieval of thousands of inventoried items. The goods may be stored in cartons due to their size or delicate construction. Therefore, storage requires loading the containers and delivering them to a known location where they can later be retrieved as necessary. When an order is received, the desired items must be retrieved from their respective positions and kitted, prepared for shipping, or otherwise put to use. An efficient storage operation requires the ability to both store and retrieve a wide variety of goods and to rapidly and effectively dispose of the retrieved items. A wide variety of warehousing/distribution systems have been proposed to reduce the labor required in warehousing operations. However, few systems have addressed both the storage and production requirements for a global distribution solution.

Certain storage and retrieval systems use large multi-level fixed storage shelves in combination with an extractor or picking mechanism that must travel to a particular shelf to pick the desired inventory item. For example, a mobile unit may traverse along a series of stationary vertical racks. The mobile unit is equipped with mechanisms for loading and unloading the vertically based storage racks. Such systems have several drawbacks. Initially, they are limited to a small number of insertion or extraction transactions each time the extractor is operated due to the need to move the picking mechanism after each insertion or extraction operation. Additionally, such systems traditionally have fixed locations for storing each type of goods received within the warehouse. This prevents efficient space utilization since the fixed location occupies the same amount of space regardless of whether a particular inventoried item has two stock units or 2000. Therefore, such systems are extremely wasteful of valuable building space.

Storage structures have also been proposed that include a movable multi-tiered storage carousel having a large number of arrays of vertically-spaced container racks arranged to form a continuous horizontally operating rack assembly which travels about a track. However, such systems have numerous drawbacks which limit their feasibility in high volume operations. Most notably, in order to insert a container onto, or extract a container from a rack on the storage carousel, the carousel must be stopped adjacent to the insertion and extraction mechanism and the container disengaged or inserted. The time required to start and stop the carousel inherently limits the speed at which container insertion and extraction operations may occur. Additionally, the requirement of repeatedly starting and stopping a carousel which may carry on the order of 700,000 tons of material, can be extremely taxing in terms of both power requirements, component wear and drive motor life. Further, it is difficult to stop such a massive structure with enough control to precisely position the containers for either insertion or extraction.

An improved automated storage and retrieval system having a storage carousel that may remain in continuous motion while containers are inserted onto or extracted from the carousel storage racks has also been developed. This system may be designated the rotating storage structure unit (RSSU).

The automated storage carousel of the RSSU dispenses with the need for stopping and starting the rack assembly for loading and unloading containers from the storage racks. This system is able to store and retrieve inventoried items in great quantities and varieties. This storage system may incorporate a relatively simple hanger arrangement for holding containers stored thereon. The system is the subject of several U.S. patents, including the following: U.S. Pat. No. 5,556,247; U.S. Pat. No. 5,282,712; U.S. Pat. No. 5,090,863; and U.S. Pat. No. 4,983,091. These patents are assigned to the assignee of the subject application and are incorporated herein by reference.

There is also a need for a smaller and less complex, and thus, less expensive, version of the RSSU. Such a small-scale system should provide rapid storage or staging and retrieval of cartons. The carton size and weight may be limited, although it need not be, to that which can be manipulated manually. This small-scale system should have a high transaction rate, which is the speed at which carton insertion and extraction operations occur. It should also be capable of installation, for instance, in an existing warehousing facility with minimal impact on other facility resources, such as sources of electrical power and compressed air. Such a system should automatically receive, store and retrieve individual cartons at a rate exceeding ten cartons per minute.

SUMMARY OF THE INVENTION

In general, in one aspect, the invention features a storage system for the storage and retrieval of material goods. The system includes a continuous track and a storage carousel movable along the track in a first direction and carrying a plurality of shelf arrays. Each shelf array includes a plurality of vertically-spaced shelves, each of which includes a substantially flat surface for receiving cartons and a shoulder projection extending along a first side of the shelf facing in the direction of movement of the carousel. The system further includes an inserter assembly disposed adjacent the carousel for transferring cartons onto the carousel while the carousel is in continuous motion and a removal assembly disposed adjacent the carousel for removing cartons from the carousel while the carousel is in continuous motion. The system further includes a control system for controlling the operation of the storage carousel, the inserter assembly and the removal assembly. The shoulder projection can facilitate insertion of cartons onto the shelves.

In another aspect, the invention features a storage system including continuous matching upper and lower tracks and a storage carousel movable along the tracks. The carousel includes a racking structure having top and bottom portions, which are connected to one another by vertical columns. Each of the vertical columns includes spaced mounting holes for facilitating attachment of a plurality of removable, vertically-spaced shelves. Shelves can thus be positioned at an adjustable vertical pitch.

In yet a further aspect, the invention features a storage carousel which is movable along tracks and which carries a plurality of shelf arrays. Each of the shelf arrays includes a plurality of vertically-spaced shelves removably attachable to the carousel at an adjustable vertical pitch.

In another aspect, the invention features a storage carousel including a racking structure for carrying shelf arrays. The racking structure has top and bottom portions, which include a plurality of lateral beam segments each having one or more slots. The storage carousel can further include a driving arrangement having a plurality of endless belts positioned about either end of a torque tube and about respective pulleys. The driving arrangement can also include a gear set for driving the endless belts which have outwardly projecting lugs for engagement with the slots in the lateral beam segments.

In an additional aspect, the invention features a removal assembly disposed adjacent the carousel for removing cartons from the carousel while the carousel is in continuous motion. The removal assembly includes a take-away section and an actuatable probe arm having first and second positions. When the probe arm is in the first position, the probe arm does not interfere with the path of oncoming cartons, and when the probe arm is in the second position, the probe arm obstructs the path of oncoming cartons so as to guide oncoming cartons toward the take-away section.

In yet another aspect, a vertical transport unit can include a plurality of compression chains each forming an endless loop. The vertical transport unit has an upward reach which can be disposed adjacent inserter assemblies for transferring cartons to the inserter assemblies, and a downward reach which can be disposed adjacent removal assemblies for receiving cartons from the removal assemblies. The chains include mounting holes for facilitating attachment of a plurality of removable platforms to the chains. The platforms can, thus, be attached to the chains at an adjustable uniform pitch.

In various implementations, the invention provides one or more of the following advantages. Shelves having a relatively simple, inexpensive structure are provided on the carousel to carry and store cartons. Cartons of various sizes and construction can be placed on the carousel without the use of hooks or latches to push, pull or lift the cartons onto the shelf. Similarly, cartons of various sizes and construction can be removed from the carousel without the use hooks or latches. In addition, the invention can provide an efficient technique for ensuring that cartons are properly positioned completely on a shelf without stopping the carousel's motion. Moreover, the invention can help reduce or prevent damage to cartons while maintaining the continuous motion of the carousel during the insertion and removal procedures.

The invention also allows for the carousel to operate at variable speeds. The speed of the carousel, as well as the speed of the inserter and removal assemblies can be decreased or increased as necessary to prevent cartons from piling up at the vertical transport unit and to prevent unnecessary delay in the insertion and removal of cartons to and from the carousel, respectively.

The invention further provides for a carousel racking structure which permits easy adjustment of the pitch at which shelves are positioned on the shelf arrays of the carousel. The pitch of the shelves can be adjusted, for example, to match the pitch of platforms on the vertical transport unit. Similarly, the invention provides for easy adjustment of the pitch at which platforms are provided on the vertical platform unit. The pitch of the platforms can be adjusted, for example, to match the pitch of the shelves on the carousel. The pitch of shelves on the carousel and platforms on the vertical transport unit can, therefore, be adjusted easily and economically to meet the requirements of the particular system. As a result, the same carousel racking structure and the same vertical transport unit can be used even as the needs of the system change.

In addition, the drive arrangement of the carousel provides an improved means for moving the carousel racking structure along the tracks and for helping maintain the shelf arrays of the carousel in an upright, vertical position. The disclosed arrangement can reduce friction, thereby reducing noise and wear on the system components. The drive arrangement can also help reduce maintenance costs.

Additional features and advantages of the invention will be readily apparent from the following description and accompanying drawings.

BRIEF DESCRIPTION OF THE DRAWINGS

FIG. 1 is a diagrammatic plan view of a materials distribution system that incorporates a multi-level storage carousel structure in accordance with the present invention.

FIG. 2 is a diagrammatic plan view of inserter/removal assemblies interposed between a corresponding end of a multi-level horizontally rotating storage carousel and a related conveyor array.

FIG. 3 is a partial elevated side view of the multi-tier shelf array of the rotating storage carousel.

FIG. 4 is a side view of the rotating storage carousel taken along the line 4—4 in FIG. 3.

FIG. 5 is a tractor drive arrangement for driving the carousel according to the invention taken along the line 5—5 in FIG. 6.

FIG. 6 is a partial elevational view of the drive arrangement and carousel racking structure taken along the line 6—6 of FIG. 4.

FIGS. 7–8 are exemplary side views of the vertical transport unit illustrating the variable pitch of its shelves.

FIG. 9 is an elevational view of a platform on the vertical transport unit.

FIG. 10 is a side view taken on the line 10—10 of FIG. 9.

FIG. 11 is a side view taken on the line 11—11 of FIG. 9.

FIGS. 12A through 12E are plan views illustrating the insertion and removal of cartons onto and from the rotating storage carousel.

FIG. 13 is a side view, taken along the line 13—13 of FIG. 12D, illustrating removal of a carton from the rotating storage carousel according to one implementation of the invention.

FIG. 14 shows a control system according to the invention.

FIG. 15 illustrates a probe arm withdrawn laterally from the path of oncoming cartons.

DESCRIPTION OF THE PREFERRED EMBODIMENTS

The staging, tracking and retrieval system of the present invention is a dual transition system including multiple components adapted to integrate the loading and unloading of cartons, including boxes, bins, totes or other containers, onto a rotary storage carousel that remains in continuous motion. The staging, tracking and retrieval ("STAR") system includes one or more multi-level storage carousels, each having an associated vertical transport unit or lift, together with multiple inserter assemblies and removal assemblies.

As shown in FIGS. 1–3, the system of the present invention includes a storage carousel 2 forming a horizontally traveling endless conveyor that carries multiple shelf arrays 10 about an oval track. Each shelf array 10 includes multiple vertically-spaced storage shelves 12. The shelf arrays 10 are arranged in side-by-side relationship so that their respective shelves 12 are arranged in tiers, one above another as shown in FIG. 3. The shelf arrays 10 are parallel to each other, and the shelves 12 in the various tiers are aligned perpendicularly with respect to the ground.

Each storage carousel 2 includes a lower track 21 (FIG. 1) and a matching upper track. The tracks 21 for each carousel are identical and continuous, oval-like in shape with rounded ends and parallel sides. The shelf arrays 10 are moved along the tracks by multiple electrically or hydraulically operated motors.

As shown in FIGS. 3 and 4, a suitable racking structure 30 is provided to support the multiple tiers of storage shelves 12. The racking structure 30 includes multiple lateral beam segments 32 which form the top and bottom of the racking structure 30. Adjacent beam segments 32 are attached to one another by connecting members 33. Each connecting member 33 is connected to two respective beam segments 32 by pins 34 which allow the beam segments 32 to pivot in the horizontal direction relative to the connecting member 33 and relative to one another as the racking structure 30 moves along the circular ends of the carousel 2. Each beam segment 32 has one or more guide wheels 37 which engage the upper or lower track 21 (see FIG. 2) of the carousel 2 to guide the beam segment and, therefore, the racking structure 30 along the tracks 21. In addition, each beam segment 32 at the bottom of the racking structure 30 includes a support wheel 38 which provides additional support for the racking structure 30. As the carousel rotates along the tracks 21, the beam segments 32 and the corresponding connecting members 33 pivot with respect to one another (see FIGS. 12A through 12E). The described structure allows the racking structure 30 to rotate along the tracks 21 without interfering with the removal assemblies 8. Also, the rounded ends of the tracks 21 can have a relatively small radius.

The inward-facing side of each beam segment 32 includes one or more elongated slots 31 or holes of another suitable shape. The slots 31 cooperate with and engage projections on timing belts to control the movement of the carousel 2 as explained further below with respect to FIGS. 5 and 6. As shown in FIG. 3, each beam segment 32 can suitably have, for example, four slots 31.

Opposing lateral beam segments 32 at the top and bottom of the racking structure 30 can be connected by a pair of spaced, vertical support columns 35, 36 which form part of the support structure for the shelf arrays 10. The columns 35, 36 include multiple vertically-spaced mounting holes or slots 39 to receive and support the shelves 12. The holes 39 in the columns 35, 36 can conveniently be spaced apart to allow the spacing between the vertically-spaced shelves 12 to be adjusted according to the requirements of the particular system. In one implementation, for example, the holes 39 are separated by approximately four inches. In such an implementation, a typical minimum spacing between adjacent vertically-spaced shelves 12 is eight inches. The vertically-spaced mounting holes 39 allow the vertical spacing between shelves 12, in other words, the pitch, to be adjusted in four-inch increments. This can be accomplished by simply by removing the shelves and re-positioning them in the holes 39 at the desired pitch. In one implementation, the shelves 12 snap into the holes 39 using cam-lock system.

FIGS. 5 and 6 illustrate the configuration and operation of a driving arrangement for the carousel 2. Two endless timing belts 101, 102 are positioned, respectively, around upper and lower drives 104, 105 of a torque tube 103. The timing belt 101, which is located near the top of the carousel 2, is also positioned around a pulley 107. Similarly, the timing belt 102, which is located near the a bottom of the carousel 2, is also positioned around a pulley 108. A gear set 106 containing a motor and gears drives the timing belts 101, 102. In certain implementations, the gear set 106 includes a variable frequency motor 109 which allows the carousel 2 to operate at variable speeds, depending on the requirements of the system at the particular time. For example, the variable frequency motor 109 can allow the carousel to operate in the range of 4–40 feet per minute, depending on the desired throughput of the system, and the frequency with which cartons are being placed on or removed from the carousel 2.

Each of the timing belts has multiple projections 110, such as lugs or cogs, on its outer surface. In the implementation shown in FIGS. 5 and 6, the sides of the lugs 110 are inclined at a small angle such that the cross-sectional area of the lugs, taken in a plane parallel to the substantially flat surface of the corresponding belt 101 or 102, decreases with increasing radial distance from the flat outer surface of the belt 101 or 102. The slots 31 in the lateral beam segments 32 of the racking structure 30 are shaped to match the shape of the lugs 110. Moreover, the distance between adjacent lugs 110, which in the implementation shown is approximately 7.5 inches, matches the distance between adjacent slots 31 in the beam segments 32. As the timing belts 101, 102 rotate around the drives 104, 105 of the torque tube 103 and around the pulleys 107, 108, the lugs 110 engage and are received by the slots 31, thereby causing the racking structure 30 of the carousel 2 to rotate along the upper and lower tracks 21 in the same direction as the belts 101, 102. The lugs 110 provide additional support for the shelf arrays 10 and help maintain the shelf arrays 10 in an upright, vertical position. Also, this arrangement can reduce friction, thereby reducing noise and wear on the system components.

Returning to FIG. 3, each storage shelf 12, which can be formed from a plastic composite material, includes a substantially flat surface 40 onto which a carton 13 can be placed. Each storage shelf 12, which in the implementation shown is square-shaped, further includes an elongated shoulder projection 42 extending along a portion of the side of the shelf 12 facing in the forward-moving direction of the carousel 2. The shoulder projection 42 extends slightly above the flat surface 40 and extends somewhat beyond the flat surface 40 in the direction in which the carousel moves. In one implementation, the shoulder projection 42 extends laterally to a position at which it just overlaps the flat surface 40 of the shelf 12 in the adjacent shelf array. The shoulder projection 42 can have rounded edges to prevent damage to the cartons 13. The shoulder projection 42 facilitates insertion of cartons 13 onto the shelves 12 as described in greater detail below. Additionally, in the implementation shown, each shelf 12 includes a raised rim 44 along the side of the shelf 12 adjacent the vertical support columns 35, 36.

Returning to FIGS. 1 and 2, a vertical transport unit (VTU) or lift 4 is provided at one end of the storage carousel 2 for carrying cartons 13 to and from each of the tiers of the carousel 2. The actual construction of the lift assembly may be widely varied, with one suitable structure discussed below. Each tier of the storage carousel 2 has an associated inserter assembly 6 and a removal assembly 8. As shown in FIG. 2, the insertion and removal of cartons can all take place at one end of the storage carousel 2. However, it should be appreciated that if demand is expected to be particularly heavy, higher picking volumes can be obtained by adding additional inserter and/or removal assemblies to the opposite end of the carousel 2. Similarly, additional vertical transport units 4 can be added, if necessary.

A conveyor network 14 is provided to carry cartons 13 between the storage carousel 2 and various work stations (now shown) wherein the cartons may be accessed by an operator. Specifically, cartons 13 are transported to the storage carousel 2, for example, from a warehouse, via a supply conveyor 15, while a take-away conveyor 16 carries removed containers away from the storage structure to the conveyor network 14 for transportation, for example, to the warehouse. Movement of the take-away conveyor 16 is controlled by a motor 19.

Assuming, by way of explanation, that operation of the system commences with the insertion of cartons 13 into the system, the cartons 13 are delivered to the storage carousel 2 via the supply conveyor 15. As the cartons 13 arrive, they are first passed through a holding station 18 before being delivered to one of multiple platforms 81 on the vertical transport unit 4. The holding station 18, whose movement is controlled by a motor 17 acts essentially as a queue for temporarily holding cartons until an empty VTU platform 81 is positioned adjacent the holding station 18 and ready to receive the carton located thereon. Holding stations are desirable because cartons 13 are likely to be delivered at random time intervals for insertion onto the storage carousel 2.

Once a carton 13 has been deposited onto a VTU platform 81, it is elevated to the inserter assembly 6 corresponding to the carousel tier at which the carton is to be placed. The carton 13 is then loaded from the platform 81 onto a queue section 50 of the inserter assembly 6. As discussed more fully below, the queue section 50 is adapted to receive cartons from a VTU platform 81 adjacent the inserter assembly 6 and to hold them temporarily in a position that is free from interference with either the VTU 4 or the storage carousel 2. The queue section 50 can include multiple traction rollers 52 whose movement is controlled by a motor 54. In the particular implementation shown, the speed of the queue section 50 is approximately one hundred and fifty feet per minute. The queue section 50 also includes one or more energizable detainers or stops 56 which can be raised to detain a carton 13 until an approach section 58 of the inserter assembly 6 is ready to receive the carton 13. The detainer 56 is lowered to allow the carton 13 to move from the queue section 50 to the approach section 58.

The approach section 58 of the inserter assembly 6 can also include multiple traction rollers 60 whose movement is controlled by a motor 62 which is synchronized with the movement of the carousel 2. Thus, for example, in the implementation described, the approach section 58 can operate at a speed in the range of 4–40feet per minute. The approach section 58 can also have a single energizable detainer or stop 57 to detain a carton 13 until the carousel 2 is ready to receive the carton. A guide strip 59 is positioned along the outer side of the inserter assembly 6 to direct the carton 13 along the inserter assembly 6 to the carousel 2. When an empty shelf 12 at the appropriate tier of the carousel 2 approaches, the detainer 57 is lowered, and the carton 13 is placed on the passing shelf 12 without requiring the carousel 2 to stop as further described below with reference to FIGS. 12A–12C.

Each time a carton 13 is placed on the carousel 2, the shelf position (by tier and shelf array) at which the carton is stored is recorded so that the carton 13 can be accessed at any desirable time in the future. A computerized control system 150 (see FIG. 14) maintains a storage record indicating the position at which each particular carton is placed on the storage carousel 2. When a request is made for particular goods, the control system 150 determines the identity of the carton holding the desired goods by checking an inventory record. Once the identity of the desired carton is determined, the storage record is searched to determine the specific shelf position at which the carton is held. When a request is placed for a particular carton, the removal assembly 8 waits until the shelf 12 that holds the desired carton passes by. As explained further below, the cartons 13 can be identified through the use of identification indicia affixed to each carton and identification scanners which read the identification indicia on the cartons. As the shelf passes by, the carton is removed from the shelf by the removal assembly 8. Details of the removal procedure are discussed below with reference to FIGS. 12A and 12D–12E. The carton is moved along a take-away section 64 of the removal assembly 8 to a queue section 70 of the removal assembly 8. The take-away section 64 can suitably include traction rollers 66 whose movement is controlled by a motor 68 synchronized with the movement of the carousel 2. The queue section 70 of the removal assembly 8 also includes traction rollers 72 whose movement is controlled by a motor 74. In the implementation shown, the speed of the queue section 70 is approximately one hundred and fifty per minute. In addition, the queue section 70 has one or more energizable detainers or stops 76 for detaining a carton 13 until a suitable opening occurs on the VTU 4. When an empty platform 81 on the downward travelling reach of the VTU is positioned opposite the queue section 70 at the appropriate tier of the carousel 2, the carton is moved onto the VTU 4. The VTU 4 carries the carton to the take-away conveyor 16 which delivers the carton to the conveyor network 14.

Each carton 13 has identifying indicia that individually identifies the particular carton. The cartons may be identified by using, for example, a Universal Product Code ("UPC") applied to an exterior corner of the carton. Such codes are typically adhered to the cartons by the manufacturer of the goods. Of course, alternative or additional coding systems, such as bar coding, can be used as well. It is desirable that each corner be labelled so that a single scanner can identify the carton regardless of its orientation as it passes by the scanner.

One or more presence scanners 20 (FIG. 1) may be positioned throughout the system to detect the presence or absence of cartons 13 at each critical position. For example, scanners 20 are provided to monitor each of the holding stations, and at each tier level of the lift on both the up travel and down travel reaches. The presence scanners would thus provide the system controller 150 with important feedback as to the position of the cartons it controls. It will be appreciated, for example, that if a particular lift platform 81, holding station 18, inserter assembly 6, or removal assembly 8 is full, then the system must be disabled to the extent that no other cartons will be directed toward that particular unit until it has sufficient room. Thus, the presence scanners 20 are intended to prevent the system from overrunning itself.

One or more identification scanners 22 (FIG. 1) can also be disposed throughout the system to read the identifying indicia on the sides of the cartons 13. Specifically, it is desirable to identify the cartons as they approach the storage carousel 2, because they are likely to be delivered on a random basis. Further, multiple identification scanners 22 can be positioned to view cartons carried by the storage carousel 2 just after each inserter assembly 6 to verify the identity of the specific cartons carried by the carousel 2.

Such scanners also are effective to rapidly re-identify the cartons stored on the carousel 2 in the event that the system controller loses its data indicative of the carousel's contents. Additional presence and/or identification scanners can be positioned advantageously at various locations throughout the system to help keep track of the location of cartons 13.

The shelf arrays 10 can also be assigned sequential numbers. An identifying indicia indicative of the shelf array number is affixed to each shelf array at consistent relative positions. The identifying indicia may take the form of bar coded labels that are readable by an identification scanner as previously described. Vertically aligned identification scanners 22 are positioned, for example, behind the inserter assemblies 6. Each carousel tier has an associated identification scanner. Additionally, an identifying scanner is provided to read the shelf array's identifying indicia.

It will be appreciated that a wide variety of automated controllers can be developed to drive the disclosed warehousing structure. A good control system must lend itself to a modular construction so that if and when the needs of the distribution system change (the desired volume often tends to rise), additional storage carousels or insertion and removal mechanisms may be added to the system with little or no change to the system software. Further, it is contemplated that the storage structure of the present invention may be incorporated into a fully automated distribution system. Therefore, the controller is adapted to lend itself to modular integration with other components of an automated distribution system.

Activities relating to the storage structure are controlled by the control system 150, described in greater detail below, that is responsible for remembering which of the cartons are within its possession, the identity of the storage carousel (if there is more than one) upon which each of the cartons 13 is located, and the actual position, by tier and shelf number, at which the carton is stored. Additionally, the control system is responsible for coordinating communications with external systems as well as overseeing the insertion and removal of containers from the various carousels.

Vertical Transport Unit

The vertical transport unit 4 ("VTU") is adapted to deliver cartons 13 from the holding station 18 to the inserter assemblies 6 and to carry removed cartons from the removal assemblies 8 to the take-away conveyor 16, as can be seen with reference to FIGS. 1 and 2. Details of a suitable VTU chosen for the purpose of illustration are described in U.S. Pat. No. 5,090,863 assigned to the assignee of the subject application and incorporated herein by reference.

According to another implementation, as shown in FIG. 7, the VTU 4 can suitably include multiple platforms 81 arranged about a pair of fixed-length compression chains 82 to travel vertically in an endless loop. A drive unit 90, activated by a motor (not shown), is provided at a position between up travel and down travel reaches for operating the VTU 4. The VTU 4 can be stopped such that each platform 81 that is on an up travel reach is positioned to deliver a carton 13 to an inserter assembly 6, and such that each platform 81 that is on a down travel reach is positioned to receive a carton 13 from a removal assembly 8. The system is designed to allow cartons 13 to travel on the platforms 81 only through the respective up travel and down travel reaches, but cartons are not carried over from one reach to the other at either the top or bottom of the VTU 4. In the particular implementation described, the VTU 4 can have approximately a four-second cycle time, in other words, the time it takes a VTU platform 81 to move through a vertical distance corresponding to the distance between adjacent tiers of the carousel 2.

Each compression chain 82 includes multiple links 84 (see also FIGS. 9–11) separated by pivot structures 85 to form an endless loop. A beam arrangement 86 with a bracket 83 at each end is connected to the inside end of each platform 81. The brackets 83 of the beam arrangement 86 can be connected to the links 84 by pins, screws or bolts 87 inserted through one or more mounting holes 88 in the links 84 and corresponding holes in the brackets 83. Nuts or similar devices can be used to hold the pins or bolts 87 in place. Furthermore, each link 84 can have multiple mounting holes 88 spaced to allow adjustment of the spacing between adjacent platforms 81 on the VTU 4. In the implementation shown, the mounting holes 88 are spaced to allow the spacing of the platforms 81 to be adjusted by four-inch increments. Specifically, in the implementation shown in FIGS. 7 and 10, each link 84 includes two parallel columns of mounting holes 88. Thus, for example, the mounting holes 88 in the two columns can be uniformly separated by a spacing of two and four inches, respectively. FIG. 8 illustrates an exemplary alternative spacing of the platforms 81 using the same links 84 as shown in FIG. 7. In this manner, the platforms 81 can be evenly spaced about the chain 82 at intervals substantially equal to the distance between tiers on the storage carousel 2. Moreover, the position of both the shelves 12 on the shelf arrays 10 of the carousel 2 and the platforms 81 on the VTU 4 can be adjusted to a desired pitch depending on the requirements of the system.

When cartons are delivered to the storage carousel 2, they arrive on the supply conveyor 15 and are delivered to the holding station 18. From the holding station 18, the cartons are transferred to a platform 81 on the same level as the holding station 18.

After a carton 13 has been properly positioned on a VTU platform 81, it can either be removed immediately from the platform and transferred to the queue section 50 of the lowermost inserter assembly 6 or it can be carried by the VTU 4 to a higher tier where it is transferred to the queue section 50 of the higher tier.

FIGS. 9–11 illustrate additional details of the platforms 81 of the VTU 4 with respect to movement of a carton 13 from a platform 81 onto the inserter assembly 6, and from the removal assembly 8 onto a platform 81. The surface of each platform 81 is provided with rollers 92 surrounded by endless traction belts 94. In addition, each platform 81 includes a slave friction wheel 96 extending beyond the side of the platform 81. As shown in FIG. 9, the slave friction wheel 96 is connected to the roller 92 closest to the carousel 2. The slave friction wheel is driven by a corresponding drive wheel 97, located at each tier of the carousel 2 at the end of the queue sections 50, 70, respectively, adjacent the VTU 4. Each drive wheel 97 can be pivoted about the corresponding queue section 50, 70 and can be controlled to swing into or out of contact with the slave friction wheel 96.

Movement of the rollers 92 on a platform 81 at a particular tier level on the up travel reach of the VTU 4 is coupled to the movement of the corresponding queue section 50. When the drive wheel 97 is swung to a position in which it contacts both a master friction wheel 98 and the slave friction wheel 96, the rollers 92 on the VTU platform 81 on the up travel reach rotate and transfer a carton on the platform 81 to the corresponding queue section 50. To stop the movement of the rollers 92 on the platform 81, the drive wheel 97 is swung out of contact with the friction wheels 96, 98.

Similarly, movement of the rollers 92 on a platform 81 at a particular tier level on the down travel reach of the VTU 4 is coupled to the movement of the corresponding queue section 70. When the drive wheel 97 is swung to a position in which it contacts both a master friction wheel 98 and the slave friction wheel 96, the rollers 92 on the VTU platform 81 on the down travel reach rotate and transfer a carton from the platform 81 to the take-away conveyor 16. To stop movement of the rollers 92 on the platform 81, the drive wheel 97 is moved out of contact with the friction wheels 96, 98.

Prior to allowing the VTU platforms 81 to move to subsequent levels on the up and down travel reaches, the platforms 81 must be uncoupled from the queue sections 50, 70 by swinging the drive wheels 97 out of contact with the respective slave friction wheels 96 on the VTU platforms 81 as described above.

It should be appreciated that the detailed construction of the VTU 4 can be widely varied within the scope of the present invention.

Insertion Procedure

To insert a carton 13 located within the inserter assembly 6 onto an approaching empty shelf 12 on the carousel 2, the carton called for is transferred from the queue section 50 to the approach section 58 immediately downstream of the queue section. To achieve the transfer, the detainer 56 is lowered, and the traction rollers 52 of the queue section 50 move the carton downstream until the carton is engaged by the power actuated traction rollers 60 of the approach section.

FIGS. 12A through 12E illustrate the insertion or placement of cartons 13', 13" onto shelves 12', 12", respectively, and the removal of carton 13'" from shelf 12'". Removal of the carton 13'" is discussed below in the next section. The carousel 2 is shown moving in the direction indicated by the arrow 122. As shown in FIG. 12A, the carton 13' has already been guided from the approach section 58 of the inserter assembly 6 partially onto the shelf 12'. The carton 13'" has previously been placed on the shelf 12'". As the carousel 2 rotates, the shelf 12'" passes a laterally extending, actuatable probe arm 120, discussed in greater detail below. Also, as the carousel 2 rotates, the carton 13' continues to be guided onto the shelf 12' by the guide strip 59.

The power actuated traction rollers 60 of the approach section 58 are directly connected with the power source that controls the carousel's rotational speed. This positively synchronizes the approach section 58 of the inserter assembly 6 with the carousel. With such an arrangement it is assured that the cartons can be properly loaded irrespective of any variations in carousel speed which might occur due to fluctuations in operation of the power source. Furthermore, as discussed above, in certain implementations the carousel 2 includes a variable frequency motor 109 which permits the optimal speed of the carousel to be changed depending on the particular requirements of the system at any given time. The synchronization between the approach section 58 and the carousel 2 allows cartons to be loaded without stopping the carousel, thereby permitting continuous motion of the carousel even as cartons are loaded onto the shelves 12. In addition, should there be, for example, a power failure, insertion activity as described would be halted at the same time, thereby avoiding any pile-up of cartons at the insertion position. When subjected to a subsequent resumption of power, the cartons are then ready to complete whatever insertion activity may been interrupted.

As the rollers 60 of the approach section 58 move the carton 13" toward the rotating carousel 2, the carton 13" is positioned on the shelf 12" as shown in FIG. 12B. The guide strip 59 helps guides the carton 13" to position it properly on the shelf 12". As the carousel 2 continues to rotate, the rollers 60 move the carton 13" onto the shelf 12" as shown in FIG. 12C. The raised rim 44 on the shelf 12" also helps position the carton 13" on the shelf 12", and, in particular, prevents the carton 13" from being positioned too close to the columns 35, 36 of the shelf array. In this manner, the rim 44 prevents the carton 13" from improperly interfering with the probe arm 120 as the carousel rotates around the tracks 21 of the carousel 2. Moreover, as the carousel 2 rotates, the elongated projection 42 on the shelf 12" moves into contact with the carton 13' on the adjacent forward shelf 12', thereby pushing the carton 13' more completely onto the shelf 12'. In this manner, a carton 13 is transferred onto an available shelf 12 without stopping the carousel 2.

Removal Procedure

When a carton 13 is called for removal from the carousel 2, it is removed from the shelf by the appropriate removal assembly. As illustrated in FIG. 1, the removal assemblies 8 are disposed opposite the inserter assemblies 6. Each removal assembly 8 includes a take-away section 64 for removing the carton from its associated carousel storage shelf 12, and a queue section 70 for temporarily storing the container until it can be transferred onto the VTU 4.

FIGS. 12A and 12D–12E illustrate the removal of the carton 13'" from the shelf 12'". As the carousel 2 rotates in the direction indicated by the arrow 122, the shelf 12'", and the carton 13'" resting on it, approaches the probe arm 120 which extends laterally in a direction parallel to the flat surface 40 of the shelves 12.

In general, the probe arm 120 has a first position which allows a carton resting on a shelf to pass the probe arm 120 and to continue, without interference, on the carousel. The probe arm 120 has a second position in which the probe arm 120 engages the carton and interferes with its movement in the rotational direction indicated by the arrow 122. When in the second position, the probe arm 120 forces the carton to move toward the take-away section 64 of the removal assembly 8.

FIG. 13 illustrates one implementation of the first and second positions of the probe arm 120. In the first position, the probe arm 120 is raised sufficiently high to allow the carton 13'" to pass beneath the probe arm 120 without interference. It will be noted that when the probe arm 120 is in the raised position, it does not interfere with the shelves on the next higher tier. In the second position, the probe arm 120 is moved to a lower position to engage the carton 13'", thereby impeding movement of the carton 13'" in the direction of the arrow 122. The probe arm 120 can be actuated to move from the first to the second position. Movement of the probe arm 120 from the first to the second position is indicated by the arrows 123 in FIG. 13. The carton 13'" is thus forced to move along a straight path onto the take-away section 64 of the removal assembly 8, as illustrated in FIGS. 12D–12E. The shelf 12'" on which the carton 13'" was resting, however, continues to move in the direction of the arrow 122, unimpeded by the probe arm 120. Once the carton 13'" is removed from the shelf 12'" and onto the take-away section 64, the probe arm 120 can be raised to its first position if oncoming shelves 12 and cartons 13 are to pass unimpeded.

In an alternative implementation, the probe arm 120 is moved horizontally into and out of the path of the carton 13'''. In this implementation, the second position of the probe arm 120, in which the probe arm 120 engages the carton 13''', is essentially the same as described above with respect to the first implementation. In the first position, however, the probe arm 120 is simply withdrawn horizontally out of the path of the carton 13''' (FIG. 15).

As previously discussed, a motor 68 is provided to drive the traction rollers 66 of the take-away section 64. To facilitate synchronization with the carousel, the motor 68 is controlled by the same variable frequency controller that runs the carousel motors. It will be appreciated that the surface speed of rollers 66 will be slightly faster than the carousel speed since it is desired that the cartons travel longitudinally at the same speed as the carousel 2 while being drawn away from the shelves 12.

In one implementation, the motor 68, as well as the motor 62 on the inserter assembly side, includes a dual controller that includes both high speed and variable frequency settings. During removal, the traction rollers 66 are synchronized with the carousel 2 through the use of the common variable frequency controller. A presence detector 20 indicates when the carton is clear from the travel path of its neighboring cartons that remain on the carousel. At that point, the motor 68 can be switched to the high speed controller which would drive the rollers 66 at a higher speed.

The traction rollers 66 can be used exclusively to pull the carton away from the carousel. In such an implementation, it may be desirable to use rubber coated traction rollers to enhance traction between the rollers 66 and the cartons 13.

In other alternative embodiments, the variable frequency motor described could be replaced by a drive connection that mechanically couples movements of the carousel to the rotation of the traction rollers. In such embodiments, the rollers 66 are driven by an interconnecting chain drive, that propels the carton to the queue section 70.

One or more energizable detainers 76 can be provided, where desired, to provide storage shelves on the queue section 70 of the removal assembly 8. Shelves of the queue section 70 are substantially the same as the on queue section 50 of the inserter assembly 6.

The cartons are transferred from the queue section 70 to one or another of the VTU platforms 81 as they travel along their down travel reach. It should be appreciated that it may not be possible to move the carton onto the first empty platform that arrives adjacent the queue section because such platforms may be designated to receive a carton from a lower tier. Optimization of the removal sequence is handled by the control system as explained below. Once on the VTU 4, cartons are progressively moved downward to the level of the take-away conveyor 16, which can also be the level of the lowermost removal assembly 8.

To unload the cartons from the VTU 4, the drive wheel 97 at the level of the take-away conveyor 16 is moved to its position between the master friction wheel 98 and the slave friction wheel 96 of the VTU platform 81 on the down travel reach and the queue section 70, respectively. In this position, the drive wheel 97 contacts both the master friction wheel 98 and the slave friction wheel 96. This causes the rollers 92 on the VTU platform 81 on the down travel reach to move in the direction toward the take-away conveyor 16, thereby transferring the carton 13 onto the take-away conveyor 16.

The components of the organizer system described above enable the storage carousel to operate continuously and uninterruptedly while containers are inserted onto and removed from selected carousel shelves. By providing selectively energizable inserter and removal assemblies 6, 8 at each carousel tier level, the organizer system lends itself to computerized control. The system also insures against jamming as a result of inadvertent malfunctioning of the moving parts because the insertion and removal operations of the organizer have a keyed synchronized engagement with the primary drive for the storage carousel. Moreover, since all levels are interconnected with the same drive, the number of levels employed is entirely arbitrary and limited only by structural limitations. Although the particular implementation of the system described above uses one carousel 2 and one VTU 4, it should be understood that the system according to the invention can use multiple, vertically-stacked carousels 2 with a single VTU 4 as well multiple carousels 2 in coordination with multiple VTUs 4. Since the various sections at the various levels are substantially modular in their construction and operation, servicing problems and routine maintenance are materially reduced.

Control System

A representative structure for the implementation of the control system 150 is shown in FIG. 14. The control system 150 can be either an integrated computer that is directly accessible by the user to input orders and the like, or it may communicate with an external master controller and/or other components. The integrated computer is suitably programmed with appropriate software having various software modules to control the mechanical and other components of the system described above. In one implementation, for example, the software can be run on a DOS IBM-compatible system. The integrated computer can include a terminal suitable for entering orders or otherwise allowing an operator to perform specific tasks and/or check the status of the system.

As shown in FIG. 14, an entry conveyor-control software module 166 controls the operation of entry conveyor mechanisms 154, which include the supply conveyor 15 and any holding stations 18 associated with it, as well as that portion of the conveyor network 14 which transfers cartons to the supply conveyor 15. The entry conveyor-control software module also receives and processes signals from presence or identification scanners 20, 22 associated with the supply conveyor 15 and the associated portion of the conveyor network 14.

An exit conveyor-control software module 164 controls the operation of exit conveyor mechanisms 152, including the take-away conveyor 16 and that portion of the conveyor network 14 to which the take-away conveyor 16 transfers cartons. The exit conveyor-control software module also receives and processes signals from presence or identification scanners 20, 22 associated with the take-away conveyor 16 and the associated portion of the conveyor network 14.

A VTU control software module 168 controls the operation of VTU-related mechanisms 156, and, in particular, the drive unit 90 of the VTU 4. The VTU control software module 168 also receives and processes signals from presence scanners 20 located at each level of the up and down travel reaches of the VTU 4.

An insertion control software module 174 controls the operation of insertion mechanisms 162, including the inserter assemblies 6 and their associated queue sections 50 and approach sections 58. In particular, the insertion control software module 174 controls the motors 54, the detainers 56 and the drive wheels 97 associated with the queue section 50 on each tier, as well as the motors 58 associated with the approach section 58. The insertion control software module 174 also receives and processes signals from presence or identification scanners 20, 22 associated with the inserter assemblies 6.

A removal or extraction control software module 170 controls the operation of the removal mechanisms 158, including the removal assemblies 8 and their associated queue sections 70 and take-away sections 64. In particular, the removal control software module 170 controls the motors 74, the detainers 76 and the drive wheels 98 associated with the queue section 70 on each tier, as well as the motors 68 associated with the take-away section 64. In addition, the removal control software module 170 controls actuation of the probe arm 120. The removal control software module 170 also receives and processes signals from presence or identification scanners 20, 22 associated with the removal assemblies 8.

A rotational control software module 172 controls the operation of carousel mechanisms 160, including the gear set 106 in the driving arrangement of the carousel 2.

A coordination control software module 176 is provided to control the interaction between the insertion control software module 174, the rotational control software module 172 and the removal control software module 170 associated with a particular carousel 2. This ensures proper coordination among the insertion, staging and removal procedures with respect to the carousel 2. If there is more than one carousel, for example, if multiple carousels are stacked vertically one above another, then a coordination control software module 176 is provided for each carousel and its associated insertion and removal assemblies 6, 8.

Finally, an overall coordination control software module 178 is provided to control the interaction among the previously mentioned modules and to ensure overall smooth and efficient operation of the staging, tracking and retrieval system.

The control system 150 also maintains storage records regarding the location of the various cartons on the carousel 2 or elsewhere in the staging, tracking and retrieval system based on the various identification indicia on the cartons 13 and the shelf arrays 10, and based on signals received from the identification scanners 22. Storage records can be updated to insure that the control system 150 has the latest information about the storage positions of the identified cartons. Additionally, the control system 150 makes decisions about the impending removal and insertion activities. By knowing, for example, which shelf arrays 10 are approaching the removal assemblies, the control system 150 can survey the storage record to determine which of a plurality of requested cartons will arrive first at the removal assemblies, and retrieval requests can be made accordingly. Further, such knowledge of the approaching shelf arrays allows the control system 150 to determine the locations of upcoming empty shelves 12 onto which newly received cartons may be stored. With such knowledge cartons can be directed to the inserter assemblies to optimize the overall insertion efficiency.

Requests for retrieval of a carton are typically generated either internally or externally in the form of an extended list of desired cartons, together with an indication of the number of cartons to be provided at any given time. It will be appreciated that the acceptable cartons list can be extended and considerably longer than the actual number of cartons desired. Of course, in an alternative embodiment, individual requests for particular cartons could be made.

When a retrieval request is made, the control system 150 surveys the storage records to determine where the requested cartons are positioned within the various storage carousels 2. Then, knowing the positions of the requested cartons, the pending removal requirements and the openings on the VTU 4, the control system 150 decides which of the listed cartons is easiest to access and should be provided. Appropriate commands or messages are generated to execute the removal of the requested carton. A message can be returned to the control system 150 indicating whether or not removal of the requested carton was successful.

As described above, the carousel can be driven at a wide variety of different speeds depending upon the needs of the system. If demand is relatively heavy, the control system 150 can slow down the carousel, because at high speeds, requested cartons will approach the removal assemblies at a rate faster than they can be carried away by VTU 4. As a general rule it is preferable to operate the system at lower speeds in order to reduce both wear on the system and energy consumption.

Although only several implementations of the present invention have been described, it should be understood that the invention can be embodied in many other specific forms without departing from the spirit or scope of the invention. Particularly, it should be noted that the specific mechanisms described herein can be widely varied to accomplish the same functions in accordance with the invention. Further, control architecture can be widely varied in accordance with various aspects of the invention. Therefore, the present examples and implementations are to be considered as illustrative and not restrictive, and the invention is not to be limited to the details given herein, but may be modified within the scope of the appended claims.

What is claimed is:

1. A storage system for the storage and retrieval of material goods, the storage system comprising:

an oval-shaped track having parallel sides and rounded ends;

a storage carousel movable along the track in a first direction and carrying a plurality of shelf arrays, each shelf array comprising a plurality of vertically-spaced shelves, each of said shelves comprising a substantially flat surface for receiving cartons and a shoulder projection extending along a first side of the shelf, wherein the shoulder projection extends above the flat surface and extends laterally beyond the flat surface in the direction of movement of the carousel to a position at which the shoulder projection partially overlaps the flat surface of a shelf of an adjacent shelf array as the carousel moves along the parallel sides of the track;

an inserter assembly disposed adjacent the carousel for transferring cartons onto the carousel while the carousel is in motion;

a removal assembly disposed adjacent the carousel for removing cartons from the carousel while the carousel is in motion; and a control system for controlling the operation of the storage carousel, the inserter assembly and the removal assembly.

2. The storage system of claim 1 wherein said shoulder projection has rounded edges.

3. The storage system of claim 1 wherein each of said shelves further comprises a raised rim extending along a second side of the flat surface of the shelf, said second side adjacent said first side.

4. The storage system of claim 1 wherein the carousel has an adjustable speed.

5. The storage system of claim 4 wherein the inserter assembly comprises friction rollers for transferring said cartons to the carousel, said friction rollers having a speed that is synchronized to the speed of the carousel.

6. A storage system for the storage and retrieval of material goods, the storage system comprising:

a continuous track;

a storage carousel movable along the track in a first direction and carrying a plurality of shelf arrays, each shelf array comprising a plurality of vertically-spaced shelves, each of said shelves comprising a substantially flat surface for receiving cartons and a shoulder projection extending along a first side of the shelf for facilitating insertion of cartons onto said shelves, wherein the shoulder projection partially overlaps the flat surface of a shelf of an adjacent shelf array at least some of the time as the carousel moves along the track;

an inserter assembly disposed adjacent the carousel for transferring cartons onto the carousel while the carousel is in continuous motion;

a removal assembly disposed adjacent the carousel for removing cartons from the carousel while the carousel is in continuous motion; and a control system for controlling the operation of the storage carousel, the inserter assembly and the removal assembly.

7. A storage system for the storage and retrieval of material goods, the storage system comprising:

continuous matching upper and lower tracks;

a storage carousel movable along said tracks and carrying a plurality of shelf arrays, each shelf array comprising a plurality of vertically-spaced shelves, said carousel comprising a racking structure for carrying said shelf arrays, said racking structure having top and bottom portions, said top and bottom portions comprising a plurality of lateral beam segments each having one or more slots, said storage carousel further comprising a driving arrangement, said driving arrangement comprising a plurality of endless belts positioned about either end of a torque tube and about respective pulleys, said driving arrangement further comprising a gear set for driving the endless belts, said endless belts comprising outwardly projecting lugs for engagement with the slots in said lateral beam segments;

an inserter assembly disposed adjacent the carousel for transferring cartons onto the carousel;

a removal assembly disposed adjacent the carousel for removing cartons from the carousel; and a control system for controlling the operation of the storage carousel, the inserter assembly and the removal assembly.

8. The storage system of claim 7 wherein said lugs engage the slots in said lateral beam segments when said gear set drives said endless belts.

9. The storage system of claim 7 wherein said gear box comprises a variable frequency motor.

10. The storage system of claim 7 wherein said carousel has an adjustable speed.

11. The storage system of claim 10 wherein the inserter assembly transfers cartons to said carousel while the carousel is moving along said track.

12. The storage system of claim 11 wherein the inserter assembly comprises friction rollers for transferring said cartons to the carousel, said friction rollers having a speed that is synchronized to the speed of the carousel.

13. The storage system of claim 10 wherein the removal assembly removes cartons from said carousel while the carousel is moving along said track.

14. The storage system of claim 13 wherein the removal assembly comprises friction rollers for removing cartons away from said carousel, said friction rollers having a speed that is synchronized to the speed of the carousel.

15. The storage system of claim 10 wherein the carousel is operable in the range of 4–40 feet per minute.

16. A storage system for the storage and retrieval of material goods, the storage system comprising:

a continuous track;

a storage carousel movable along said track and carrying a plurality of shelf arrays, each shelf array comprising a plurality of vertically-spaced shelves for carrying cartons along a path about said track;

an inserter assembly disposed adjacent the carousel for transferring cartons onto the carousel while the carousel is in continuous motion;

a removal assembly disposed adjacent the carousel for removing cartons from the carousel while the carousel is in continuous motion, said removal assembly comprising a take-away section and an actuatable probe arm having first and second positions, wherein, when the probe arm is in said first position, the probe arm does not interfere with the path of oncoming cartons, and wherein, when the probe arm is in said second position, the probe arm obstructs the path of oncoming cartons so as to guide oncoming cartons toward said take-away section; and a control system for controlling the operation of the storage carousel, the inserter assembly and the removal assembly, wherein the probe arm is controllable to be moved to the second position prior to arrival of an oncoming carton so as to guide the oncoming carton to the take-away section.

17. The storage system of claim 16 wherein, in said first position, the probe arm is in a raised position above the path of oncoming cartons.

18. The storage system of claim 16 wherein, in said first position, the probe arm is laterally withdrawn from the path of oncoming cartons.

19. The storage system of claim 16 wherein said carousel has an adjustable speed.

20. The storage system of claim 19 wherein the removal assembly comprises friction rollers for removing cartons away from said carousel, said friction rollers having a speed that is synchronized to the speed of the carousel.

21. The storage system of claim 20 wherein the carousel is operable in the range of 4–40 feet per minute.

22. A storage system for the storage and retrieval of material goods, the storage system comprising:

a continuous track;

a storage carousel movable along said track and carrying a plurality of shelf arrays, each shelf array comprising a plurality of vertically-spaced shelves, said shelf arrays forming multiple tiers of shelves;

a plurality of inserter assemblies disposed adjacent the carousel for transferring cartons onto the shelves at each of the tiers of said carousel;

a plurality of removal assemblies disposed adjacent the carousel for removing cartons from the shelves at each of the tiers of said carousel;

at least one vertical transport unit comprising a plurality of compression chains each forming an endless loop, the vertical transport unit having an upward reach disposed adjacent said inserter assemblies for transferring cartons to said inserter assemblies, and a downward reach disposed adjacent said removal assemblies for receiving cartons from said removal assemblies, said chains comprising a plurality of links each of which has multiple mounting holes for facilitating attachment of platforms at variable positions on each of the links, whereby said platforms can be attached to the chains at an adjustable uniform pitch; and a control system for controlling the operation of the storage carousel, the inserter assemblies, the removal assemblies, and the vertical transport unit.

23. The storage system of claim 22 wherein a spacing between adjacent mounting holes permits said platforms to be attached in multiples of approximately four-inch increments.

24. The storage system of claim 22 wherein the links are connected by pivot structures.

25. The storage system of claim 22 wherein the mounting holes form two parallel columns in each of said links.

26. The storage system of claim 22 further comprising a plurality of removable platforms attached to the chains at a pitch of at least eight inches.

27. The storage system of claim 22 further comprising a plurality of removable platforms attached to the chains at a pitch corresponding to the spacing of adjacent tiers of shelves on said carousel.

28. The storage system of claim 22, further comprising a plurality of platforms removably attached to the vertical transport unit, wherein said platforms are attached to the chains at a pitch corresponding to the spacing of adjacent tiers of shelves on said carousel.

29. A vertical transport unit for use in a storage system comprising a storage carousel carrying a plurality of shelf arrays, each shelf array comprising a plurality of vertically-spaced shelves, said shelf arrays forming multiple tiers of shelves, a plurality of inserter assemblies disposed adjacent the carousel for transferring cartons onto the shelves at each of the tiers of said carousel, a plurality of removal assemblies disposed adjacent the carousel for removing cartons from the shelves at each of the tiers of said carousel, said vertical transport unit comprising:

a plurality of compression chains each forming an endless loop to form an upward reach disposed adjacent said inserter assemblies for transferring cartons to said inserter assemblies, and a downward reach disposed adjacent said removal assemblies for receiving cartons from said removal assemblies, said chains comprising a plurality of links each of which has multiple mounting holes for facilitating attachment of platforms at variable positions on each of the links, whereby said platforms can be attached to the chains at an adjustable pitch.

30. A vertical transport unit for use in a storage system, the vertical transport unit comprising:

a plurality of compression chains each forming an endless loop to form an upward reach and a downward reach, each of said chains comprising a plurality of links connected by pivot structures, each of said links comprising multiple mounting holes for facilitating attachment of platforms at variable positions on each of the links;

a plurality of removable platforms attached to said links; and a drive unit for driving said upward and downward reaches.

31. The storage system of claim 30 wherein the mounting holes form two parallel columns in each of said links.

* * * * *